United States Patent
Seed et al.

(10) Patent No.: US 10,212,654 B2
(45) Date of Patent: Feb. 19, 2019

(54) NEIGHBOR DISCOVERY TO SUPPORT SLEEPY NODES

(71) Applicant: CONVIDA WIRELESS, LLC, Wilmington, DE (US)

(72) Inventors: Dale N. Seed, Allentown, PA (US); Shamim Akbar Rahman, Quebec (CA); Lijun Dong, San Diego, CA (US); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 14/902,605

(22) PCT Filed: Jul. 11, 2014

(86) PCT No.: PCT/US2014/046268
§ 371 (c)(1),
(2) Date: Jan. 4, 2016

(87) PCT Pub. No.: WO2015/006636
PCT Pub. Date: Jan. 15, 2015

(65) Prior Publication Data
US 2016/0174148 A1  Jun. 16, 2016

Related U.S. Application Data

(60) Provisional application No. 61/845,635, filed on Jul. 12, 2013.

(51) Int. Cl.
*H04W 52/02* (2009.01)
*H04W 40/00* (2009.01)
(Continued)

(52) U.S. Cl.
CPC ......... *H04W 52/0203* (2013.01); *H04W 4/70* (2018.02); *H04W 40/005* (2013.01);
(Continued)

(58) Field of Classification Search
None
See application file for complete search history.

(56) References Cited

U.S. PATENT DOCUMENTS 7,623,497 B2   11/2009  O'Neill
8,125,892 B1 *  2/2012  Jokimies ............... H04W 4/00
                                              370/216
(Continued)

FOREIGN PATENT DOCUMENTS

JP    2000-165419 A    6/2000
JP    2002-244833 A    8/2002
(Continued)

OTHER PUBLICATIONS

Shelby, et al, "Neighbor Discovery Optimization for IPv6 over Low-Power Wireless Personal Area Networks (6LoWPANs)," Internet Engineering Task Force (IETF), RFC 6775, Nov. 2012, 55 pages.*
(Continued)

*Primary Examiner* — Jamal Javaid
*Assistant Examiner* — Rosene Clark
(74) *Attorney, Agent, or Firm* — Baker & Hostetler, LLP

(57) ABSTRACT

Many internet of things (IoT) are "sleepy" and thus occasionally go into a sleep mode. As described herein, nodes in a connected network of nodes may determine that other nodes in the network are sleepy. Further, nodes, such as endpoint devices and routers for example, may process packets in the network based on a reachability state of their neighboring nodes.

14 Claims, 16 Drawing Sheets

(51) Int. Cl.
*H04W 4/70* (2018.01)
*H04W 40/24* (2009.01)
*H04W 84/22* (2009.01)

(52) U.S. Cl.
CPC ...... *H04W 52/0216* (2013.01); *H04W 40/246* (2013.01); *H04W 84/22* (2013.01); *Y02D 70/142* (2018.01); *Y02D 70/144* (2018.01); *Y02D 70/162* (2018.01); *Y02D 70/164* (2018.01); *Y02D 70/21* (2018.01)

(56) References Cited

U.S. PATENT DOCUMENTS

| | | | |
|---|---|---|---|
| 8,625,628 | B2 | 1/2014 | Qiang |
| 8,654,366 | B2 | 2/2014 | Toda |
| 9,137,752 | B2 | 9/2015 | Son et al. |
| 9,225,660 | B2* | 12/2015 | Sasin ............... H04L 47/70 |
| 2004/0013099 | A1 | 1/2004 | O'neill |
| 2005/0130713 | A1* | 6/2005 | Simpson ............ H04L 1/16 455/574 |
| 2010/0220641 | A1 | 9/2010 | Son |
| 2011/0213871 | A1 | 9/2011 | DiGirolarno et al. |
| 2013/0044740 | A1 | 2/2013 | Qiang |
| 2013/0272182 | A1* | 10/2013 | Li ............... H04W 28/02 370/311 |
| 2013/0332627 | A1* | 12/2013 | Skog ............. H04L 61/106 709/244 |
| 2014/0086124 | A1* | 3/2014 | Knowles ......... H04W 52/0277 370/311 |
| 2014/0126391 | A1* | 5/2014 | Liu ............. H04W 52/0206 370/252 |
| 2014/0161118 | A1* | 6/2014 | Iyer ............. H04W 52/0216 370/351 |
| 2014/0189075 | A1* | 7/2014 | Stansell ........... G06F 9/546 709/220 |
| 2014/0328240 | A1* | 11/2014 | Munari ........... H04W 40/005 370/311 |
| 2014/0376405 | A1* | 12/2014 | Erickson ......... H04W 52/0212 370/254 |
| 2016/0141534 | A1 | 5/2016 | Navarro et al. |

FOREIGN PATENT DOCUMENTS

| | | |
|---|---|---|
| JP | 2010-193359 A | 9/2010 |
| JP | 2012-138783 A | 7/2012 |
| JP | 2016-525793 A | 8/2016 |
| WO | WO 2011/112683 | 9/2011 |
| WO | WO 2012/115551 | 8/2012 |

OTHER PUBLICATIONS

Japanese Application No. 2016-525793: Notice of Reasons for Rejection dated Jan. 25, 2017, 3 pages.
Conta et al, "Internet Control Message Protocol (ICMPv6) for the Internet Protocol Version 6 (IPv6) Specification", Network Working Group, RFC 4443, Mar. 2006, 24 pages.
Gnawali, O. and Levis, P., "The Minimum Rank with Hysteresis Objective Function", Internet Engineering Task Force (IETF), RFC 6719, Sep. 2012, 13 pages.
Hui, J. and Thubert, P., "Compression Format for IPv6 Datagrams over IEEE 802.15.4-Based Networks", Internet Engineering Task Force (IETF), RFC 6282, Sep. 2011, 24 pages.
International Application No. PCT/US14/46268: International Preliminary Report dated Jun. 17, 2015, 21 pages.
International Application No. PCT/US2014/046268: International Search Report and Written Opinion dated Dec. 9, 2014, 12 pages.
Levis et al, "The Trickle Algorithm", Internet Engineering Task Force (IETF), RFC 6206, Mar. 2011, 13 pages.
Montenegro et al, "Transmission of IPv6 Packets over IEEE 802.15.4 Networks", Network Working Group, RFC 4944, Sep. 2007, 30 pages.
Narten et al, "Neighbor Discovery for IP version 6 (IPv6)", Network Working Group, RFC 4861, Sep. 2007, 97 pages.
Postel, J., "Internet Control Message Protocol Darpa Internet Program Protocol Specification,", Network Working Group, RFC 792, Sep. 1981, 21 pages.
Shelby et al, "Constrained Application Protocol (CoAP) Draft-Shelby-Core-Coap-01", May 10, 2010, 33 pages.
Tschofenig, H. and Arkko, J., "Report from the Smart Object Workshop", Internet Architecture Board (IAB), RFC 6574, Apr. 2012, 32 pages.
Vasseur et al, "Routing Metrics Used for Path Calculation in Low-Power and Lossy Networks", Internet Engineering Task Force (IETF), RFC 6551, Mar. 2012, 30 pages.
Winter et al, "RPL: IPv6 Routing Protocol for Low-Power and Lossy Networks", Internet Engineering Task Force (IETF), RFC 6550, 157 pages.
European Patent Application No. 14 747 218.7: Office Action dated Jun. 13, 2017, 6 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type 304   |    Code 306   |         Checksum 308          |  ⎱ 302
+-+-+-+-+-+-+-+-+-+-+-+-+-+-+-+-+-+-+-+-+-+-+-+-+-+-+-+-+-+-+-+-+
|                      Rest of ICMP Header                      |
+-+-+-+-+-+-+-+-+-+-+-+-+-+-+-+-+-+-+-+-+-+-+-+-+-+-+-+-+-+-+-+-+
~                          ICMP Payload                         ~  ← 310
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type 402    |  Length 404   |          Value 406 ...        |
+-+-+-+-+-+-+-+-+-+-+-+-+-+-+-+-+-+-+-+-+-+-+-+-+-+-+-+-+-+-+-+-+
~                         Value 406...                          ~
+-+-+-+-+-+-+-+-+-+-+-+-+-+-+-+-+-+-+-+-+-+-+-+-+-+-+-+-+-+-+-+-+
```

NEIGHBOR DISCOVERY TO SUPPORT SLEEPY NODES

CROSS REFERENCE TO RELATED APPLICATIONS

This application is a National Stage Application filed under 35 U.S.C. 371 of International Application No. PCT/US2014/046268, filed Jul. 11, 2014, which claims the benefit of U.S. Provisional Patent Application Ser. No. 61/845,635 filed Jul. 12, 2013, the disclosure of which is hereby incorporated by reference as if set forth in its entirety herein.

BACKGROUND

An Internet of Things (IoT) refers generally to a global infrastructure that interconnects things to the internet. A thing in the IoT may refer to a uniquely identifiable physical or virtual thing that is accessible via network connectivity. Such things may be integrated into an information network through intelligent interfaces. An IoT system may refer to any system within the internet of things. IoT systems may include one or more end devices, such as sensors for example, which may be referred to as a front-end. IoT systems may include gateways to other networks, which may be referred to as a back-end. Many IoT devices have at least some combination of limited battery power, small memory footprint, or low throughput links. In addition, many of these devices are "sleepy," which means that the devices can go into a sleep mode. A sleep mode generally refers to a low power state that conserves power. When in a sleep mode, devices often suspend network communication. Devices may wake-up and re-establish communication after being in the sleep mode, and thus the suspension of network communication may be temporary. For example, a device may wake-up in response to an event that occurs or devices may be awaken after a preconfigured amount of time expires.

Both IoT endpoint devices and IoT routers can be sleepy. An example IoT implementation is shown in FIG. 1. FIG. 1 is a block diagram of an example system 100, such as a wireless sensor network (WSN) for example. The system 100 may be multi-hop in nature and may include battery operated IoT devices that function as endpoint devices. For example, the system 100 may include a plurality of IoT devices 102. The devices 102 may function as endpoint devices 104 or router devices 106 that route upstream and downstream packets to/from the endpoint devices 104. Existing approaches to supporting IoT sleepy nodes have several shortcomings. For example, nodes are often not aware of whether other nodes in a network are sleepy, and thus do not efficiently and effectively communicate in networks with sleepy nodes.

SUMMARY

Systems, methods, and apparatus embodiments are described herein for sleep-awareness of nodes in a network, such as an Internet of Things (IoT). In one embodiment, a system comprises a plurality of nodes which communicate via an internet of things (IoT). A first node of the plurality of nodes may determine that a second node of the plurality of nodes is a sleepy node. The sleepy node is configured to enter a low power state and suspend communications with the first node. The first node may also determine various sleep variables that correspond to the sleepy node. The sleep variables may enable the first node to communicate with the second node or communicate with an alternative node. The plurality of nodes comprises endpoint devices and at least one router. The router may be configured as the sleepy node and/or the endpoint devices may be configured as sleepy nodes.

In one example embodiment, a first node of a plurality of nodes that communicate with each other via a network receives a packet that is targeted for a second node of the plurality of nodes. The first node may determine that the second node is a sleepy node configured to enter a low power state and suspend communications with the first node. The first node determines a reachability state of the second node, and processes the packet based on the determined reachability state. The first node may receive a solicitation message that includes one or more sleepy node variables indicative of sleepy attributes of the second node. For example, when second node is sleeping, and thus the determined reachability state is a sleeping state, the first node may store the packet for a time duration specified in one of the sleepy node variables. When the time duration elapses, the first node may send the packet to the second node. Alternatively, when the determined reachability state is a sleeping state, the first node may send an alert to a node that sent the packet. The alert may include a sleep time that remains before the second node wakes up. In accordance another embodiment, when the determined reachability state is a sleeping state, the first node may send the packet to a redirect node specified by one of the sleepy node variables. The redirect node may be a proxy for the second node or functionally equivalent to the second node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 3 shows an example of an Internet Control Management Protocol (ICMP) header format;

FIG. 4 shows an example of a type-length-value (TLV) format of an ND message;

DETAILED DESCRIPTION OF ILLUSTRATIVE EMBODIMENTS

Figure 1:
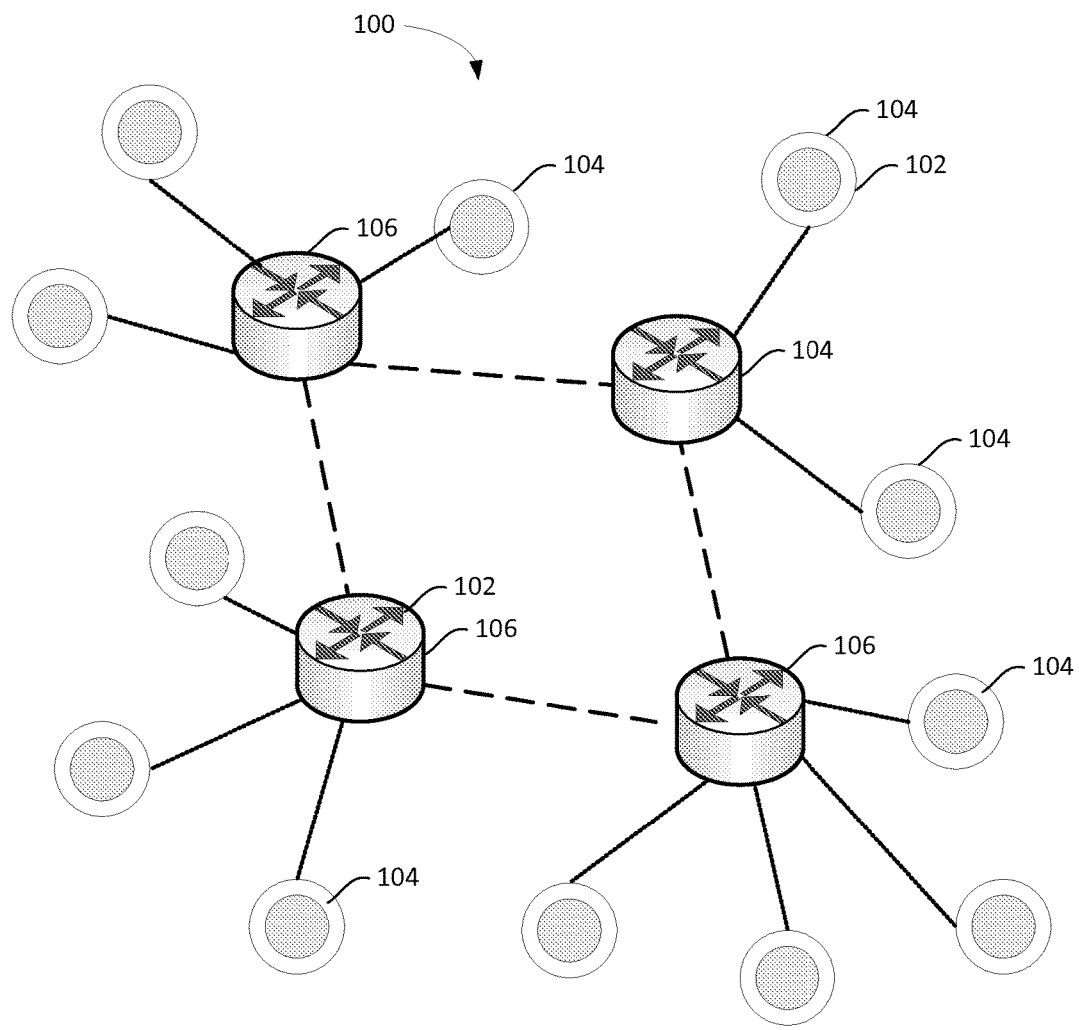
FIG. 1 is a block diagram of an example that includes internet of things (IoT) sleepy endpoint devices and IoT sleepy routers that communicate with each other via an IoT.

As used herein, an Internet of Things (IoT) refers to an internet protocol (IP) based infrastructure that interconnects IoT nodes, or things, to the internet. As used herein, the term IoT may refer to any network in which devices can communicate with each other, and thus the IoT may also be referred to as an IoT system or a machine-to-machine (M2M) communication system. An IoT system may consist of IoT things, IoT entities, IoT services, IoT applications, or the like. While devices, applications, services, or the like are often referred to herein as "IoT" devices, applications, services, or the like, it will be understood that the "IoT" qualifier is presented by way of example, and not presented by way of limitation. For example, an IoT thing or node refers to a uniquely identifiable physical or virtual thing that is accessible via network connectivity. Thus, IoT nodes may be hosts, routers, or any other devices that communicate via a network, which may be referred to as the IoT. As used herein, an IoT host may refer to an IoT node that is not a router (e.g., an endpoint device). An IoT router refers to an IoT node that forwards IP packets to another IoT router or IoT host to which the packets are addressed. As used herein, the term sleepy node or sleep node may refer to Internet of Things (IoT) sleepy endpoint devices or IoT sleepy routers. The term 'sleepy' or derivatives thereof imply that a node is capable of entering a sleep mode that conserves power. Thus, an IoT sleepy node may go to sleep, which refers to a low power state, for instance a no power state that conserves power. While sleeping, the IoT node may temporarily suspend network communication until it wakes up and re-establishes network communication.

The Internet Protocol version 6 (IPv6) over Low power Wireless Personal Area Networks (6LoWPAN) is a version of the IPv6 networking protocol that is suitable for resource constrained (e.g., IoT) devices. The 6LoWPAN Neighbor Discovery Request for Change (RFC) 6775 is a version of IPv6 neighbor discovery targeted for use in 6LoWPAN based networks. The Internet Engineering Task Force (IETF) IPv6 Routing Protocol for Low power and Lossy Networks (RPL) is a lightweight IPv6 routing protocol suitable for IoT networks such as wireless sensor networks (WSNs) for example. IETF CoAP is a lightweight RESTful application/transport protocol. It is recognized herein that the aforementioned protocols are often implemented without an awareness of whether nodes are sleepy. Further, the aforementioned protocols are often implemented without knowledge of sleep attributes of sleepy nodes or sleep states of sleepy nodes.

Network nodes (e.g., hosts and routers) may use IPv6 Neighbor Discovery (ND) to determine the link-layer addresses for neighbors and to purge cached values that become invalid. Neighboring nodes refer to nodes that may directly communicate with one another such that no intermediary nodes exist between them. Hosts (e.g., endpoint devices) may implement IPv6 ND to find neighbor routers that are able to forward packets on their behalf. Further, nodes may use the IPv6 ND protocol to actively keep track of which neighbors are reachable and which are not, and to detect changed link-layer addresses. For example, when a router or a path to a router fails, a host may actively search for functioning alternates. Below is a summary of the individual IPv6 ND protocol features, presented by way of example.

The IPv6 ND protocol defines five different Internet Control Management Protocol (ICMP) packet types. The packet types are described, for example, in the IPv4 ICMP RFC 792 and the IPv6 ICMP RFC 4443. The described packet types include router solicitation, router advertisement, neighbor solicitation, neighbor advertisement, and redirect. Router solicitation packets may be sent when an interface becomes enabled. For example, when an interface becomes enabled, hosts may send out router solicitations that request routers to generate router advertisements immediately, rather than waiting for a scheduled time. A router advertisement packet time refers to a scenario in which routers advertise their presence with various links and internet parameters. The advertisements may be periodic or in response to a router solicitation message. Router advertisements may contain prefixes that are used for determining whether another address shares the same link (on-link determination). Router advertisement prefixes may further contain prefixes that indicate an address configuration, a suggested hop limit value, or the like. A neighbor solicitation packet may be sent by a node to determine a link-layer address of a neighbor, or to verify that a neighbor is still reachable via a cached link-layer address. Neighbor solicitations may also be used for duplicate address detection. A neighbor advertisement packet may be sent in response to a neighbor solicitation message. A node may also send unsolicited neighbor advertisements to announce a link-layer address change. A redirect packet may be used by routers to inform hosts of a better first hop for a particular destination.

IPv6 ND also defines the various data structures that may be maintained by nodes. The defined data structures include neighbor cache, destination cache, prefix list, default router list, and node configuration variables. A neighbor cache data structure may be used to maintain a set of entries of neighbors to which traffic has been recently sent. Entries are used to store information such as, for example, a neighbor's link-layer address, whether the neighbor is a router or a host, a pointer to any queued packets waiting for address resolution to complete, a reachability state, or the like. A destination cache data structure may be used to maintain a set of entries about destinations to which traffic has been recently sent. Entries map a destination IP address to the IP address of the next-hop neighbor. Entries are updated with information learned from redirect messages. A prefix list data structure may include a list of prefixes that define a set of addresses that are on-link. A default router list data structure may include a list of routers discovered during router solicitation. The list of routers may represent routers to which a node may forward packets. Node configuration variables may represent a set of variables used for configuration of a node.

IPv6 ND also defines Neighbor Unreachability Detection and Next-Hop Determination algorithms that support detecting a failure associated with sending packets to neighboring nodes that are no longer reachable and support determining a next hop to which a packet can be forwarded. RFC 4861 introduces enhancements to IPv6 ND that are aimed at low-power and lossy networks, such as 6LoWPAN based networks for example. Example enhancements that are proposed by RFC 4861 include: elimination of multicast-based address resolution operations for hosts; host-initiated interactions (instead of router-initiated) to accommodate sleeping hosts; definition of a new address registration option (ARO) extension; a neighbor discovery option to distribute 6LoWPAN header compression context to hosts; multi-hop distribution of prefix and 6LoWPAN header; and multi-hop duplicate address detection (DAD), which uses two new ICMPv6 message types. RFC 4861 further proposes allowing hosts to register their addresses to routers with a specified registration lifetime. For example, routers may not need to perform address resolution using neighbor solicitation (NS) and neighbor advertisement (NA) messages. The registration lifetime may also be used to enhance the neighbor unreachability detection algorithm.

Existing Internet protocols, such as protocols described above for example, lack support for sleepy nodes. For example, existing protocols often assume that sleepy nodes remain fully powered and maintain network connectivity at all times. IoT type devices are often resource constrained by nature. Thus, in some cases, IoT devices may be battery-powered and may sleep at least some, for instance a majority, of time.

The IPv6 Neighbor Discovery (ND) protocol is an example protocol that lacks support for sleepy IoT nodes (e.g., sleepy endpoint devices and sleepy routers). In some cases, current protocols lack awareness of the functionality of IoT nodes. As used herein, sleep awareness generally refers to knowledge of a node's sleep capabilities and sleep attributes. For example, the IPv6 ND protocol lacks sleep awareness by lacking awareness of: whether IoT nodes go to sleep or not; an IoT node's current sleep state (e.g., awake vs. asleep); an IoT node's sleep duration; whether an IoT sleepy node wakes-up and goes to sleep in a periodic fashion (e.g., based on a defined sleep schedule/pattern) or in a non-periodic fashion (e.g., event-based); and the like. It will be understood that a node or protocol may lack sleep awareness by lacking awareness of any of the attributes presented by way of example above, or other attributes associated with sleep that are not presented by way of example above.

As described above, 6LoWPAN ND defines a feature to allow sleepy nodes to register to one or more default routers using a neighbor solicitation message that includes the address registration option (ARO) to specify a ND registration lifetime for sleepy nodes, but it is recognized herein that existing protocols do not effectively support this feature to render it useful for a sleepy node or its neighbors.

Figure 2A:
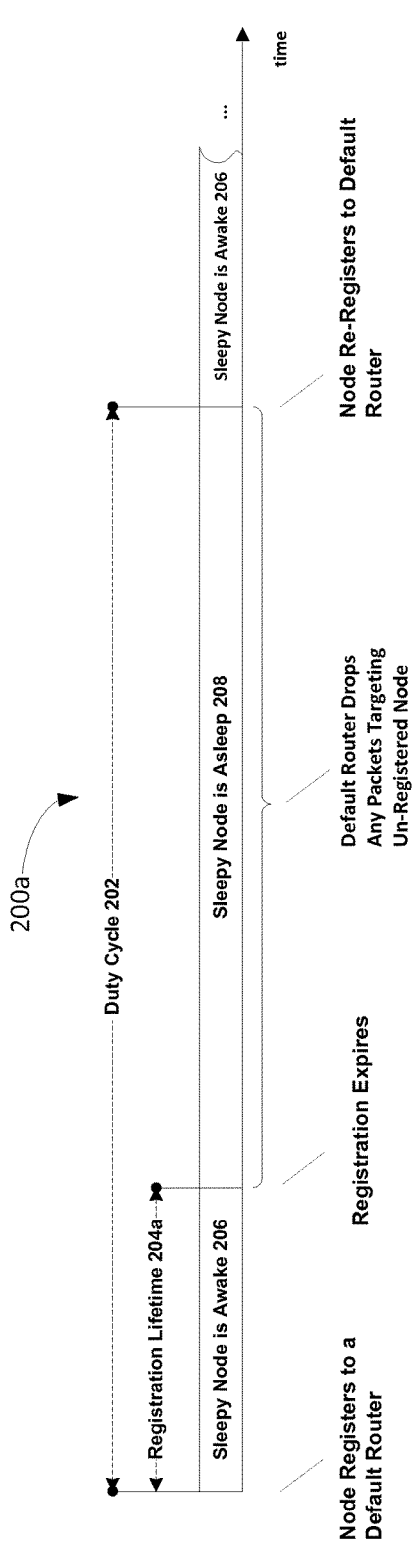
FIG. 2A shows an example inefficiency related to an neighbor discovery (ND) message protocol.
Figure 2B:
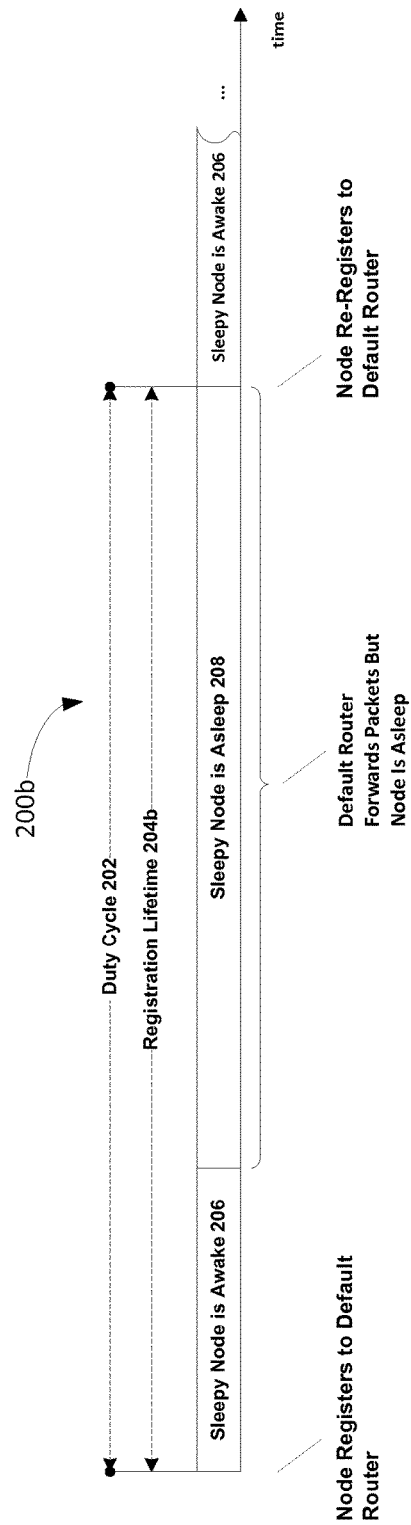
FIG. 2B shows another example inefficiency related to the ND message protocol.

Referring to FIGS. 2A and 2B, a duty cycle 202 of a sleepy node, such as one of the devices 102 for example, is depicted. As shown, the duty cycle 202 includes a time period in which the node remains awake (an awake period 206) and a time period when the node is asleep, which may be referred to as a sleep period 208. An ND registration lifetime may be configured so that the lifetime is coordinated with the sleepy node's duty cycle 202, for example, when the node's sleep pattern is periodic in nature. Example message formats 200a and 200b are shown in FIGS. 2A and 2B, respectively. Referring to FIG. 2A, an ND registration lifetime 204a defines a duration that matches the awake period 206. Referring to FIG. 2B, an ND registration lifetime 204b defines a duration that is equal to the duty cycle 202 of the node.

Both of the implementations shown in FIGS. 2A and 2B may be problematic from an ND protocol perspective. At the beginning of the ND registration lifetimes 204a and 204b, the node registers to a default router so that the default router will send/receive message packets to/from the node. When the ND registration lifetimes 204a and 204b expire, the default router may delete the node's neighbor cache entry so that the default router no longer sends/receives messages to/from the node. Thus, referring to FIG. 2A, the sleepy node's ND registration expires when the node goes to sleep, which may result in a default router deleting the sleepy node's neighbor cache entry from its neighbor cache. Thereafter and until the sleepy node wakes up and re-registers to the default router, any packets that arrive at the default router that target the sleepy node may be dropped by the router. Referring to FIG. 2B, the ND registration lifetime 204b defines a duration that equal to the duty cycle 202 of the sleepy node. Thus, the registration is renewed by the sleepy node each time the node wakes up and re-registers with its default router. As a result, the router may save the neighbor cache entry for the sleepy node. In some cases, however, the router may be unable to determine if and when the sleepy node goes to sleep. Thus, the router may forward packets to the sleepy node when the node is sleeping, resulting in inefficient use of link layer resources. Resources may be inefficiently used because network bandwidth may be wasted and congestion may be caused by unnecessarily sending packets to nodes that are sleeping. Further, the use of link layer buffers may be inefficient because messages may be queued until nodes wake up. As illustrated by the examples described with reference to FIGS. 2A and 2B, the router may also not be able to effectively differentiate a node that is sleeping from a node that is no longer reachable, which may refer to a node that is no longer present in the network. It is recognized herein that not being able to determine such a differentiation may prevent the router from supporting value-added sleep aware packet processing functionality.

By way of example, to further compound some of the example problems identified above as described with reference to FIGS. 2A and 2B, some nodes may go to sleep and/or wake-up in a non-periodic and/or unpredictable manner, and thus there may not be an opportunity for a sleepy node to correlate its ND registration lifetime with its sleep schedule/pattern. As described above, the lack of sleep awareness by the IPv6 and 6LoWPAN ND protocols may result in inefficiencies when the ND protocol is used in IoT networks having sleepy nodes. Further, networks using communication protocols that lack sleep awareness may prevent those networks from supporting sleep aware functionality.

Various embodiments described herein address at least the problems described above. In an example embodiment, extensions to the IPv6 and 6LoWPAN Neighbor Discovery (ND) protocols support sleepy IoT nodes. For example, in accordance with an example embodiment, ND sleepy node variables can be queried to discover the sleepy functionality that is supported by a node. Sleepy node variables associated with a node are indicative of sleepy parameters of that node. By way of example, sleepy node variables may be included in solicitation messages or advertisement messages, as described herein. Such variables may be configured to control or modify a node's sleep-related functionality. As described below, various embodiments implement extensions to the neighbor solicitation, neighbor advertisement, router solicitation, router advertisement, and redirect ICMP ND message types to support various messages associated with sleepy node information that is sent among nodes. Example messages include query messages, exchange messages, configuration messages, subscription messages, and notification messages. By way of further example, embodiments described herein implement messages that support reporting of a failed delivery of packets to sleepy nodes. Various embodiments further implement extensions to an IoT node's Neighbor Cache, Destination Cache, and Default Router List entries to support local storage of sleepy node context information for neighboring IoT nodes in a network. Further still, embodiments may implement extensions to next hop determination and neighbor unreachability detection mechanisms to support sleep awareness and differentiation of sleepy nodes as compared to unreachable nodes. Such embodiments may enable efficient interaction with sleepy nodes regardless of whether those nodes have unpredictable sleep schedules/patterns.

As further described below, the example extensions for ND sleepy nodes messaging may help enable various functionality. In one example embodiment, routers may be solicited based on sleepy node context information. For example, a node may discover a particular router, for instance a router that does not go to sleep or a router that does not sleep longer than a certain amount of time, or the like. In another example embodiment, sleepy node context information may be advertised between network nodes such that nodes can make sleep aware decisions. Example sleep aware decisions include, presented by way of example and without limitation, sleep aware message routing, sleep aware message forwarding, or the like. In yet another embodiment, one or more sleep parameters of a sleep node may be configured by other nodes in a network. Such configuration may coordinate sleep schedules of different nodes with each other. As further described below, in accordance with various embodiments, packets may be processed by one node and forwarded to one or more neighboring nodes in a sleep aware fashion such that the neighboring nodes can make sleep aware decisions. Examples of sleep aware decisions include a decision to store-and-forward a packet when a node wakes up, a decision to forward a packet to a node that is functionally equivalent or a proxy to a sleeping node, a decision to redirect a sender such that the sender re-sends a packet to a node that is a functionally equivalent node or proxy node of a sleepy node, a decision to drop a packet and notify the sender that a destination node is currently sleeping, or the like.

The IPv6 and 6LoWPAN ND protocols describe a set of node variables that can be queried to discover functionality that a node supports. Such variables may be configured to control or modify behavior of a node. Referring to Table 1, in accordance with an example embodiment, various variables can be queried to discover sleep attributes associated with a node. Such variables may be referred to herein as sleepy node ND variables. The sleepy node variables, as described herein, can be configured locally by the sleepy node with which the variable are associated or remotely by other nodes in the network. For example, local configuration of sleepy node variables may be performed using ND functionality. Alternatively, sleepy node variables may be locally configured via an interface that is between the ND protocol and other protocols or applications that are hosted on the sleepy node (e.g., MAC layer protocol, CoAP layer protocol, applications, or the like). Remote configuration of sleepy node variables may be performed using ND message extensions described herein.

Sleepy node variables that are time-based, for example the TimeBeforeNextSleep variable shown in Table 1, can be defined with respect to a shared time reference point that is known between nodes and that is supported by the ND protocol. For example, the start of an ND registration lifetime window, which may be established each time a node registers to its default router, may be used as a common reference point in time, and thus relative sleepy node time durations may be based on the start of the registration lifetime window. Referring to Table 1 below, which shows example sleepy node variables, a setting of TimeBeforeNextSleep=2 means that an IoT node will go to sleep 2 seconds following the start of the ND registration lifetime window. Table 1 includes sleepy node variables that are presented by way of example. It will be understood that additional sleepy node variables may be implemented by embodiments described herein as desired.

TABLE 1

| Sleepy Node Variables | Values | Description |
| --- | --- | --- |
| IsSleepyNode | TRUE or FALSE | Whether node is a sleepy node or not. If configured to FALSE, then other sleepy node variables defined herein may not be applicable. |
| SleepEnabled | TRUE or FALSE | Used to enable or disable sleepy node functionality. |
| SleepState | AWAKE or ASLEEP | Whether node is currently asleep or not |
| SleepType | Periodic or Non-Periodic | Whether node sleep pattern is periodic or non-periodic. |
| maxSleepDuration | Time (e.g., in seconds) | Max time (e.g., in seconds) that a node will sleep without waking up |
| TimeBeforeNextSleep | Time (e.g., in seconds) | Time (e.g., in seconds) before node will go to sleep next, or a list of multiple scheduled times that node will go to sleep. |
| DurationOfNextSleep | Time (e.g., in seconds) | Duration (e.g., in seconds) of next sleep, or a list of durations for many next sleep occurrences. |
| DutyCycleAwakeDuration | Time (e.g., in seconds) | If node's sleep pattern is periodic, the duration of the duty cycle that node remains awake |
| DutyCycleSleepDuration | Time (e.g., in | If node's sleep pattern is periodic, the duration of the |

TABLE 1-continued

| Sleepy Node Variables | Values | Description |
| --- | --- | --- |
| | seconds) | duty cycle that node remains asleep |
| SleepNotificationsSupported | TRUE or FALSE | Whether or not node supports generating a notification when it goes to sleep and/or wakes up |
| SleepNotificationsEnabled | TRUE or FALSE | Used to enable or disable sending of a notification each time sleepy node goes to sleep or wakes up |
| SleepNotificationCriteria | List of Notification Criteria | A list of supported criteria for generating notifications based on change in value of one or more sleepy node variables. |
| SleepSubscribers | List of IP addresses | List of IP addresses of nodes that have subscribed to receive sleep related notifications based on sleep notification criteria |
| SleepProxy | IP address of proxy | An IP address for a node that is capable of serving as a proxy for the sleepy node when it is sleeping. A proxy can perform functions such as store-and-forwarding, caching, etc. on behalf of the sleepy node. |
| SleepGroup | List of IP addresses | A sleep group is a group of functionally equivalent nodes that sleep in a coordinated fashion such that at any one time one node in the group is awake and can service requests on behalf of the group while other nodes in the group are sleeping. |

The IPv6 and 6LoWPAN ND protocols define a neighbor cache data structure. The neighbor cache stores entries associated with neighbor nodes that contain information about the neighbor nodes. In an example embodiment described below, an enhanced neighbor cache stores and manages context information associated with neighbor sleepy nodes. The described neighbor cache further supports storing a neighbor's sleepy node variables, such as the variables listed in Table 1 for example. For example, neighbor cache entries may be used to keep track of a neighboring node's sleep capabilities and sleep state, which may be used to support different types of sleep aware ND features such as those features described herein. In another example embodiment, a sleeping state is a supported Neighbor Cache Entry state. Using the sleeping state, extensions to the IPv6 and 6LoWPAN ND Neighbor Unreachability Detection mechanisms may be implemented according to various embodiments described below.

The IPv6 and 6LoWPAN ND protocols also define a destination cache data structure. An entry stored in a destination cache maps a destination IP address to the IP address of the next-hop neighbor. Additional information may also be stored in destination cache entries. In an example embodiment, an enhanced destination cache structure allows a neighbor's sleepy node variables (e.g., the variables listed in Table 1) to be stored in the destination cache. Thus, the use of destination cache entries may be qualified by the information indicated by sleepy node variables.

The IPv6 and 6LoWPAN ND protocols also define a default router list data structure. A default router list may maintain a list of available routers that a node may discover by sending router solicitations and receiving corresponding router advertisements. Each entry in this list contains information associated with a router, such as an IP address of a router for example. Additional information may also be stored in default router list entries. In accordance with an example embodiment, sleepy node variables, such as the sleepy node variables depicted in Table 1, associated with a router are stored in entries of the default router list. Thus, the use of default router list entries may be qualified by information indicated by sleepy node variables.

The IPv6 and 6LoWPAN ND protocol define a set of ICMP message types. ICMP messages are carried in the payload of an IP packet. ICMP messages have an 8-byte header and a variable size data payload as described in IPv4 ICMP RFC 792 and the IPv6 ICMP RFC 4443. An example ICMP message 300 is depicted in FIG. 3. Referring to FIG. 3, the first four bytes of an ICMP header 302 is consistent across ICMP message types, while the second four bytes of the header 302 can vary based on the type of the ICMP message 300. As shown, an ICMP type field 304 is used to specify a type of ICMP message 300. A code field 306 is used to indicate a sub-type of the ICMP message 300. A checksum field 308 is used for error checking and contains a checksum that is computed across the header 302 and a payload 310 of the ICMP message 300. In an example embodiment described herein, the set of ICMP message types that are used by the IPv6 and 6LoWPAN ND protocols are extended such that each of the sleepy nodes ND ICMP message extensions defined in the following sub-sections are supported by one or more of the following implementations.

In one example implementation, ICMP message types are defined by reserving an ICMP message type in the range of 42-255 with the Internet Assigned Numbers Authority (IANA) registry. Example ICMP messages may support one or more subtypes (e.g., using the Code field 306), 4-bytes of message specific header (e.g., using the upper 4-bytes of an ICMP 8-byte header), and the data payload 310 with values and length that can be tailored to the message. For example, using these subtypes, 4-bytes of header, and data payload, sleepy node related information can be carried in the message 300. For example, various ICMP message types can be defined and used for exchanging sleepy node context information, configuring sleepy node parameters (variables), subscribing to sleepy nodes such that nodes are notified of changes in a state of the sleepy node, and reporting unreachable sleepy nodes.

In an alternative implementation to defining new ICMP message types, in accordance with another embodiment, ICMP subtypes are defined for existing ICMP message types (e.g., existing ND ICMP message types). As described herein, example ICMP subtypes support sleepy nodes and are defined by reserving an ICMP message code for a respective message with the IANA registry. In an example, each ICMP message may support up to 255 different subtypes. For example, one or more new subtypes may be added to the existing destination unreachable ICMP message so that a destination can be indicated as being unreachable because the destination is sleeping or one of the intermediate nodes in the routing path to the destination is sleeping.

In yet another alternative implementation, in accordance with an example embodiment, ND Message option types are defined such that sleep node options described herein are supported. Referring to FIG. 4, the IPv6 and 6LoWPAN ND protocols define a generic Type-Length-Value (TLV) based packet 400, which can also be referred to as a TLV based option 400, that can be included in the payload of ICMP ND messages, such as the payload 310 of the message 300 for example. Each ND message supports a set of respective options defined by the ND protocols. The format of the TLV based option 400, as defined by IPv4 ICMP RFC 792 and the IPv6 ICMP RFC 4443, is shown in FIG. 4. Referring to FIG. 4, a type field 402 is an 8-bit unique identifier. A length field 404 is an 8-bit field that stores the length of the TLV packet 400 in bytes. A value field 406 is a variable length field that may depend on the option type. In accordance with an example embodiment described herein, example ND sleepy node options are supported by defining unique identifiers for the type field 402. Lengths and values may correspond to each unique identifier. For example, each of the sleepy node variables listed in Table 1 may be carried in ND messages by defining corresponding ND option types for the type field 402. Alternatively, multiple sleepy node variables may be carried within a single ND option that has a defined structure to carry multiple sleepy node variables.

In accordance with one embodiment, an ND query extension to ND ICMP messages is used to specify a query string within an ND ICMP message containing one or more attribute value pairs. Query attribute value pairs can be based on sleepy node variables, such as those listed in Table 1 for example. An example query extension described herein may be used within a router solicitation message or neighbor solicitation message to allow an IoT node to query neighboring nodes to find one or more neighboring nodes that satisfy a specified set of sleepy node requirements. For example, when a router receives a router solicitation ND message with a query string, the router may use the string to determine whether or not the router responds back with a router advertisement. This determination can be performed by comparing attribute value pairs against the state of the router's variables. If a match occurs, for example, the router may respond with a routing advertisement. If a match does not occur, for example, the router may silently ignore the solicitation or forward it to another router in the network for the other router to process. By way of example, to find a router that does not sleep, a query string such as 'IsSleepyNode==FALSE' may be used in a router solicitation message.

In accordance with one embodiment, an ND context extension is used to embed context information within ND ICMP messages. Context information may be embedded by the sender of the message. Via such an ND context extension, for example, sleepy nodes may advertise their sleepy node variables (e.g., such as those listed in Table 1) to other nodes in a network by including this information as sleepy node context within ND ICMP messages they send. This information may then be used by recipient nodes to become aware of the presence of sleepy nodes in the network. Further, recipient nodes may track changes (e.g., sleep states) of sleepy nodes in the network. Thus, nodes may maintain awareness of neighboring sleepy node states and make corresponding sleep-aware adjustments to their own functionality to better serve sleepy nodes. For example, a node may update its neighboring nodes of a change in the node's sleep state by including the SleepState variable as context information within an ND ICMP message (e.g., Router Solicitation, Neighbor Solicitation, etc.).

In accordance with an example embodiment, an ND configuration extension may be used to specify configuration parameters for recipients of ND ICMP messages. Thus, one more sleepy node variables (e.g., such as those listed in Table 1) may configured using an ND ICMP message. For example, when a node receives an ND ICMP message with a configuration extension, the node may use the message to configure corresponding ND variables on the node. By way of example, a router may include a configuration message within a router advertisement message that the router sends in order to coordinate the sleep durations of neighboring sleepy nodes. Using the example configuration extension to the ND ICMP message, the router can configure sleepy node variables such as TimeBeforeNextSleep, DurationOfNextSleep, DutyCycleAwakeDuration, DutyCycleSleepDuration, or the like.

In accordance with an example embodiment, ND subscription and notification extensions to ND messages may be used to subscribe to a node and receive notifications from the node based on the occurrence of a specified ND condition or event (e.g., change in ND variable state). Subscription requests may be sent within ND ICMP messages in accordance with an example embodiment. A subscription extension to an ND ICMP message may include one or more targeted variables, such as the sleepy node variables listed in Table 1 for example, along with corresponding criteria for when a notification should be generated related to the one or more targeted variables. Further, notifications may be sent within ND ICMP messages. A notification may include event information, such as, for example, which ND variables have changed state, new values of variables that have changed state, or the like.

By using a subscription extension within a router advertisement message, a router may subscribe to receive notifications from sleepy nodes each time a sleep state variable of the sleepy nodes changes state. For example, this may be achieved by including a criterion based on sleep state in the subscription extension that may be included in the router advertisement. Thus, nodes may generate a notification to the router each time their sleep state changes value (e.g., from AWAKE to ASLEEP and visa-versa). Based on these notifications, a router can efficiently maintain up-to-date versions of its neighboring nodes' sleep variables and use this information to more effectively forward packets in a sleep-aware fashion.

In an example embodiment, a destination sleeping ICMP message extension is used by an IoT router to inform a requester that the destination node it is targeting (or an intermediate node along the routing path to the destination) is currently sleeping. Thus, the requester is informed that the request cannot be sent to the destination node. The destination sleeping ICMP message may include sleep related information such as, for example, a sleep schedule (e.g., duration of time before node is expected to wake up), contact information for a proxy that is serving the sleepy node, or the like. The requester may use this message (information) to react accordingly. For example, in response to information, the requester may perform various actions such as, for example, retrying when the sleepy node is scheduled to wake up, targeting a node in the network that is a proxy for the sleepy node, redirecting the request to an alternate node in the network, or the like.

Figure 5:
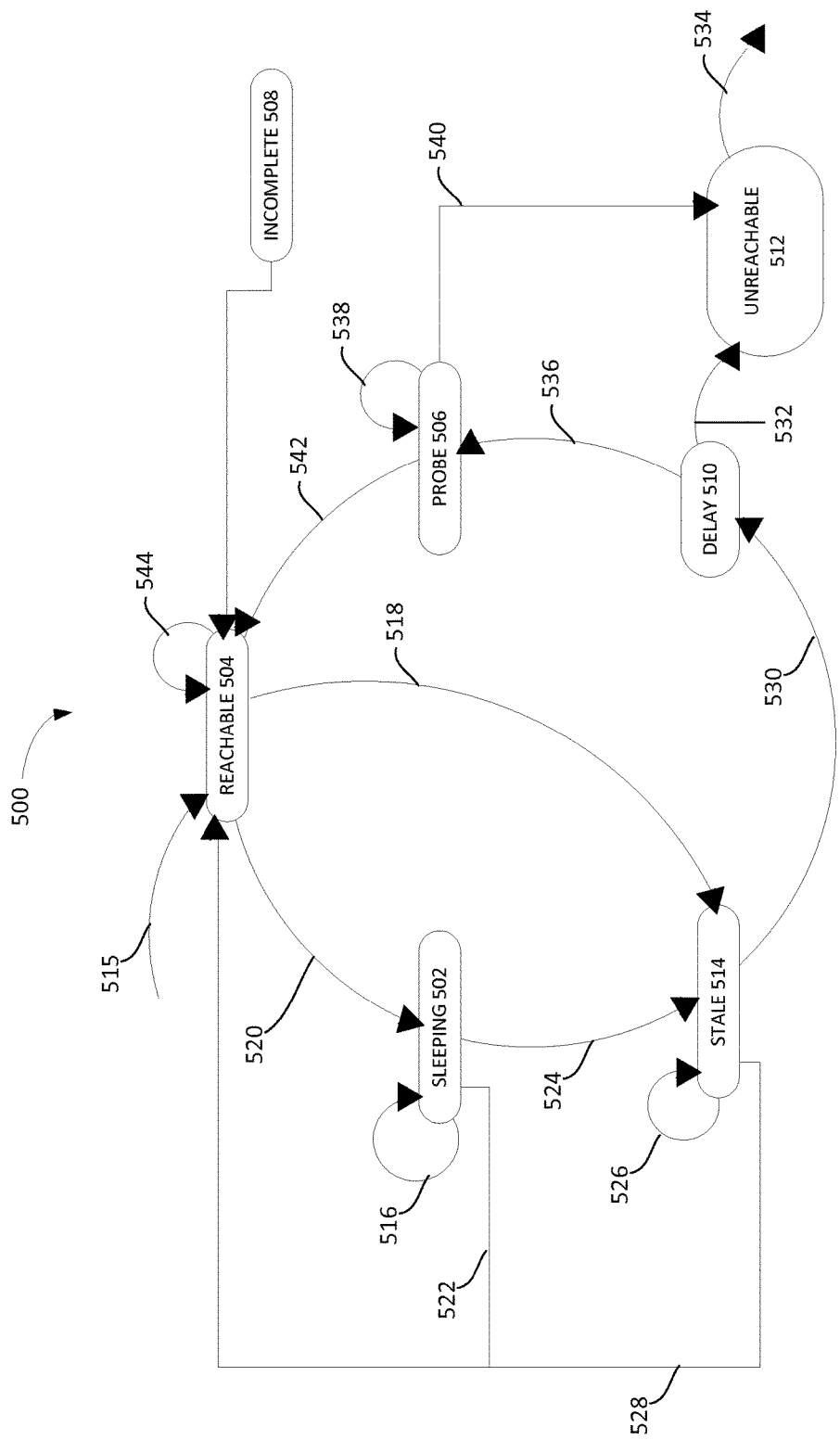
FIG. 5 is state diagram that shows various reachability states of an example node in accordance with an example embodiment.

FIG. 5 shows an example state diagram 500 for sleep-aware operations that can be implemented by example nodes, such as one or more of the devices 102 in the example system 100 for example. Referring now to FIG. 5, in accordance with the illustrated embodiment, the diagram 500 can also be referred to as a ND Neighbor Unreachability Detection (NUD) diagram 500. As shown, the diagram includes a sleeping state 502, which may also be referred to as a reachability state. Other illustrated reachability states include a reachable state 504, a probe state 506, an incomplete state 508, a delay state 510, an unreachable state 512, and a stale state 514. The Neighbor Unreachability Detection diagram 500 may be used to determine whether a node, such as one of the devices 102 for example, is reachable or not. For example, a first node, which may be one of the devices 102 in the system 100 for example, may maintain a neighbor node's reachability state in a neighbor cache entry of the first node. The diagram 500 defines how the reachability state is maintained and conditions for which transitions between the reachability states occur in accordance with an example embodiment.

The incomplete state 508 may indicate that an address resolution is in progress and the link-layer address of the neighbor node has not yet been determined by the first node. The reachable state 504 may indicate that the neighbor node is known to have been reachable within a predetermined time period. For example, the first node may have reached the neighbor node within the previous ten seconds, though it will be understood that the predetermined time period may be any amount of time as desired. The stale state 514 may indicate that the neighbor node is no longer known to be reachable, but no attempt should be made to verify its reachability until traffic is sent to a neighbor of the neighbor. The delay state 510 may indicate that the neighbor node is no longer known to be reachable, and traffic has recently been sent to the neighbor. Rather than probe the neighbor immediately, however, the delay state 510 may indicate that probes should be sent after a predetermined time duration, for example, to give upper-layer protocols an opportunity to provide a reachability confirmation. The probe state 506 may indicate that the neighbor node is no longer known to be reachable, and unicast neighbor solicitation probes are being sent to verify reachability of the neighbor node. The unreachable state 512 may indicate that the neighbor node is no longer reachable. Thus, the first node may remove the entry associated with the neighbor node from the first node's neighbor cache.

Still referring to FIG. 5, at 515, neighbor node may set a neighbor cache entry associated with the neighbor node to the reachable state 504. For example, the first node may receive a neighbor solicitation message from the neighbor node that includes one or more sleepy node variable options and an ARO associated with the neighbor node. The ARO may be configured with a registration lifetime, as described above. At 518, the first node may determine that the neighboring node has transitioned from the reachable state 504 to the stale state. Such a determination may be made when the first node determines that the neighbor node is not a sleepy node (e.g., not capable of sleeping) and a predetermined time limit, which may be referred to as a reachable time, has elapsed since the last confirmation that the neighbor node is functioning. At 520, the first node transitions the neighbor cache entry associated with the neighbor node to the sleeping state 502 from the reachable state 504. For example, the first node may detect or predict that the neighbor node is sleeping. By way of example, the first node may detect or predict that the neighbor node is sleeping by evaluating sleepy node variables associated with the neighbor node or by evaluating information from upper layer protocols. At 516, the neighbor node is sleeping, and thus the first node maintains the neighbor cache entry associated with the neighbor node in the sleeping state 502. At 522, the first node transitions the neighbor cache entry associated with the neighbor node from the sleeping state 502 to the reachable state 504, for example, after detecting or predicting that the neighbor node has woken up such that the neighbor node is no longer sleeping. Various embodiment described herein, including the sleepy node variables and the ND ICMP message extensions described above for example, may be used to detect or predict when a node is sleeping and when it wakes up. For example, at 522, a neighbor solicitation with an address registration option (ARO) may be received by the first node. At 524, the first node transitions the neighbor cache entry associated with the neighbor node from the sleeping state 502 to the stale state 514, for example, because a registration lifetime associated with the neighbor node has elapsed since the previous neighbor solicitation with the ARO was received by the first node. At 526, no packets are received by the first node that need forwarded to the neighbor node, and thus the neighbor cache entry associated with the neighbor node may remain in the stale sate 514. At 528, the first node transitions the neighbor cache entry associated with the neighbor node from the stale state 514 to the reachable state 504, for example, because a neighbor solicitation with the ARO is received by the first node.

Alternatively, in accordance with the illustrated embodiment, at 530, the first node transitions the neighbor cache entry associated with the neighbor node from the stale state 514 to the delay state 510, for example, because at least one packet is received by the first node and forwarded to the neighbor node. At 532, the first node transitions the neighbor cache entry associated with the neighbor node from the delay state 510 to the unreachable state 512. For example, the first node may determine that the neighbor node is a sleepy node, and the first node may not have received a reachability confirmation within a defined time period associated with the delay state. It will be understood that the defined time period may vary as desired. If the neighbor node is determined to be unreachable, the neighbor cache entry associated with the neighbor node may be deleted by the first node, at 534. At 536, the first node transitions the neighbor cache entry associated with the neighbor node from the delay state 510 to the probe state 506. For example, the first node may determine that the neighbor node is a sleepy node, and the first node may not have received a reachability confirmation within a defined time period associated with probing. At 538, one more neighbor solicitations may be sent by the first node to the neighbor node. The solicitations may be sent periodically based on a retransmission timer. At 540, when a maximum number of neighbor solicitation messages have been sent, the first node transitions the neighbor cache entry associated with the neighbor node from the probe state 506 to the unreachable state 512. Alternatively, if a neighbor advertisement from the neighbor node is received by the first node before the maximum number of solicitations have been sent, the first node transitions the neighbor cache entry associated with the neighbor node from the probe state 506 to the reachable state 504, at 542. At 544, in accordance with the illustrated embodiment, a forward path to the neighbor node remains functioning with the reachable time, and thus the first node maintains the neighbor cache entry associated with the neighbor node in reachable state 504. It will be understood that the above described embodiments enable the first node to differentiate between when the neighbor node is not responding because the neighbor node is in the sleeping state 502 or when the neighbor node is in the unreachable state 512.

Thus, as described above, in a system comprising a plurality of nodes that communicate with each other via a network, a first node of the plurality of nodes may receive a packet that is targeted for a second node of the plurality of nodes. The first node may determining that the second node is a sleepy node configured to enter a low power state and suspend communications with the first node. This node may further determine a reachability state of the second node, and process the packet based on the determined reachability state. As described above, the first node may receive a solicitation message that includes one or more sleepy node variables indicative of the second node. Thus, first node may process the packet in accordance with the solicitation message, and thus in accordance with the sleepy node variables.

Referring generally to FIG. 5, it will be understood that the first node may use different techniques described herein for detecting or predicting a sleep state of the neighbor node. Such detections or predictions may be based on, for example, the type of node and its corresponding sleep patterns and sleep functionality. For example, if a sleepy node supports advertising or notifying its neighbors each time the state of one or more of its sleepy node variables change, the first node may rely on these updates for transitioning in/out of the sleeping state 502. Similarly, if a sleepy node sleeps in a periodic manner, then a sleepy node can provide its sleep schedule and/or duty cycle to its neighbors during an initial message exchange (e.g., during default router registration) and the neighbors may use this information to predict when the node is sleeping and when it is awake, and thus transition in/out of the sleeping state 504 accordingly. In an example scenario in which a sleepy node sleeps in an unpredictable and non-periodic manner and does not support updating its neighboring nodes each time its sleep state changes, the neighboring nodes may receive information from higher and/or lower layer protocols that enable the neighboring nodes to determine whether packets that are sent to the sleepy node are reaching it or not (e.g., sleepy node is responding with CoAP or TCP acknowledgements, etc.). Using various information described above, for example, neighboring nodes may determine whether a particular node is sleeping or not and may manage transitions in/out of the sleeping state 502 accordingly.

Based on the state information described with respect to FIG. 5, sleep aware unreachability decisions are supported. For example, when a sleepy node is in the sleeping state 502, packets for the sleepy node may be stored until a state transition to the reachable state 504, at which time the packets may be forwarded to the sleepy node. Thus, a node, such as first node for example, may store a packet targeted for a second node for a time duration specified in one of a plurality of sleepy node variables that are indicative of sleepy attributes of the second node. In one example, when the time duration elapses, the first node may send the packet to the second node. In some cases, when a sleepy node is in the sleeping state 502, a notification may be returned to a requester such that the requester is notified that the sleepy node is sleeping. By way of another example, when a requested node is in the sleeping state 502, a requester node may be redirected to an alternate node that is awake (e.g., a node that proxies for the sleeping node, or a node that is a member of the same group, etc.).

Figure 6:
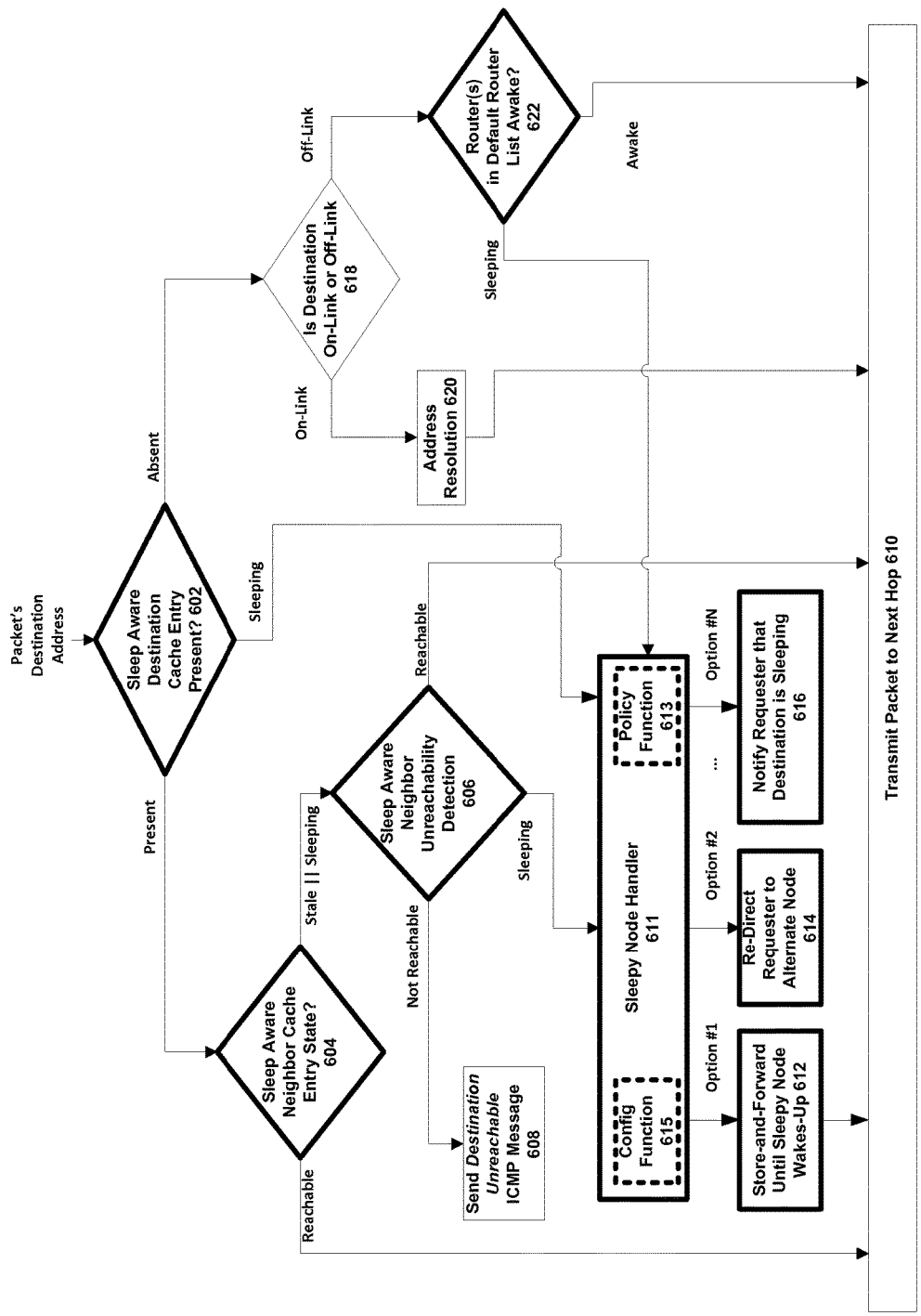
FIG. 6 is a flow diagram of an extended sleepy node ND Next-Hop Determination according to an example embodiment.

FIG. 6 shows an example process flow for sleep aware operations that can be performed by an example node, such as one or more of the devices 102 in the example system 100 for example. The IPv6 and 6LoWPAN ND protocols describe an example of how Next-Hop determinations can be made by a first node. The next-hop refers to a second node to which the first node forwards a packet. Results of next-hop determination computations may be saved in the destination cache, as described above. FIG. 6 shows an example process flow for sleep aware next hop determinations that can be performed by a node, in accordance with an example embodiment.

Referring to FIG. 6, an example node, for instance a first node, which can also be referred to as sender node, determines a next-hope node to which the first node can send a packet. In accordance with the illustrated embodiment, the first node receives the packet from another node, which can be referred to as a requestor or requesting node, and determines a destination address of the packet. The destination address may correspond to a second node, which may also be referred to as a destination node. At 602, the first node determines whether there is an entry in its destination cache that corresponds to the destination address of the packet. If an entry is present, the process proceeds to 604, where the first node determines a reachability state of the destination node. If the first node determines that the second node is in the sleeping state 502 or the stale state 514, the first node detects a status of the second node via neighbor solicitation messages, by proceeding to 606. If the first node determines that the second node is in the unreachable state 512, the first node may send a destination unreachable message to the requestor, at 608. If the first node determines that the second node is in the reachable state 504, the first node may transmit the packet to the next hop (at 610), which may be the destination node or a node en route to the destination node. If the first node determines that the second node is in the sleeping state 502, for example by evaluating one or more sleepy variables associated with the second node, a sleepy node handler function 611 may be performed. The sleepy node packet handler function 611 may support multiple options for processing the packet that targets a node that is sleeping. By way of example, at 612, the first node stores the packet and forwards the packet when the second node wakes up, at 610. At 614, in accordance with the illustrated embodiment, the first node redirects the request to send the packet to an alternate node. At 616, the first node notifies the requester that the destination node is sleeping. Although processing options 612, 614, and 616 are illustrated, it will be understood that the first node can select other processing options described herein as desired.

To determine which processing option is used to handle the packet that is destined for a node that is sleeping, the sleepy node handler function 611 can support various mechanisms. In accordance with the illustrated embodiment, the sleepy node handler function 611 may use a policy function 613 to determine how to process a packet destined for a node that is sleeping. The policy function 613 can include a set of policies that can be provisioned and/or configured on the first node. Thus, how the packet is processed may be based on one or more policies. The sleepy node handler function 611, and thus the first node, may also determine how the packet is processed by evaluating one or more fields within a header of the packet. The fields in the header may specify how the packet should be handled by the sleepy node handler function 611. In accordance with the illustrated embodiment, the sleep handler function 611 may use a configuration function 615 to process a packet destined for a node that is sleeping. The second node that is a sleepy node may interact with the configuration function 615 to specify its preferred technique that is used by a default router to handle its packets when it is sleeping. For example, a sleepy node may specify this information when registering to the default router. Thus, if the second node has registered its preferences with the configuration function 615, the first node may determine how a packet destined for the second node should be processed when the second node is asleep by evaluating the configuration function 615.

Referring again to 602, if the first node determines that there is an entry in its destination cache and that the entry indicates that the second node is sleeping, the process may proceed to the sleepy node handler function 611. If no entry is found, the process proceeds to 618, where the first node determines whether the destination is on-link or off-link. In one embodiment, if no entry exists for the destination, a next-hop determination computation is invoked to create a new destination cache entry. After the IP address of the next hop is known (via the destination cache or via next-hop determination), the neighbor cache may then be consulted for link-layer information about that neighbor. If the destination node is in-link, the first node resolves the address of the destination node, at 620, and then transmits the packet, at 610. If the destination is off-link, in accordance with the illustrated embodiment, the first node determines whether a router in the default router list associated with the destination is awake, at 622. If the routers in the list are sleeping, the process proceeds to the sleepy node handler function 611. If there is a router in the list that is awake, the first node transmits the packet to the next hop, which is the awake router, at 610. The first node may select a default router from the list of default routers based on a router sleepy node variable state.

Figure 7:
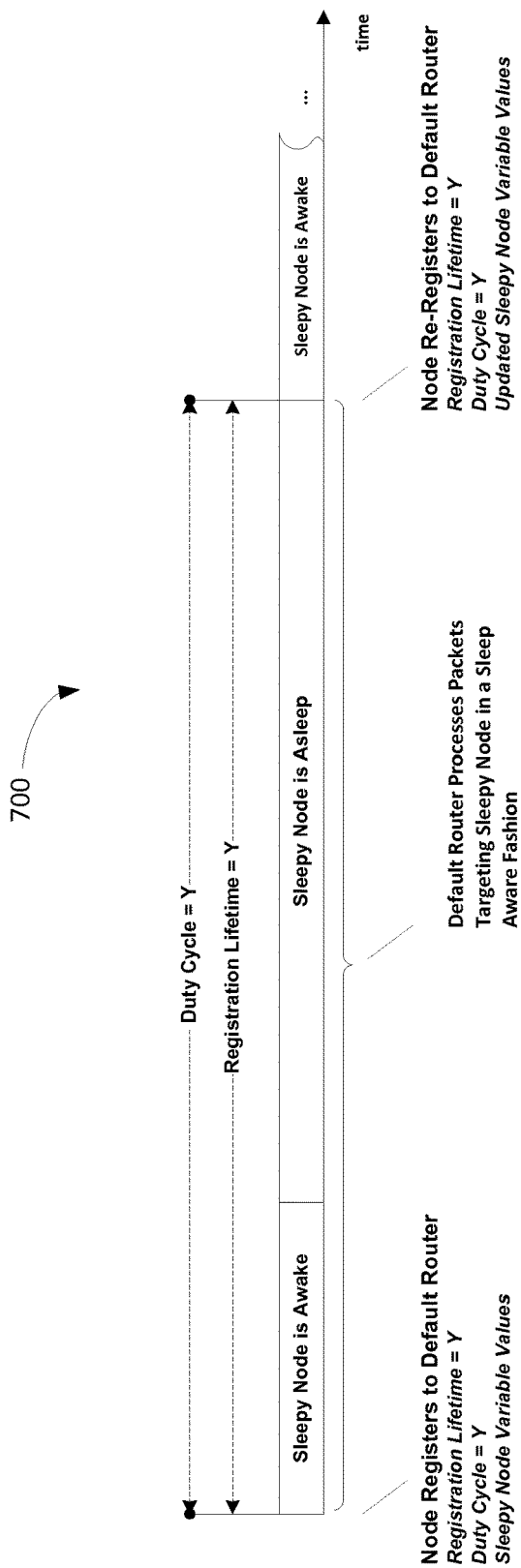
FIG. 7 shows a sleepy node registering to its default router, wherein sleepy node variables are included in the registration in accordance with an example embodiment.

Various embodiments described herein enhance Next-Hop Determination mechanisms such that nodes may make next-hop decisions in a sleep aware fashion. For example, FIG. 7 illustrates an example message 700 that can be used by a sleepy node to register to its default router. The message 700 includes sleepy node variables, for example the sleepy node variables described herein with reference to Table 1. Using the published state of the sleepy node variables associated with the sleepy node, and the enhanced Neighbor Cache, Default Router List, Destination Cache, Next-Hop Determinations, and Neighbor Unreachability Detections as described above, the default router can make packet processing decisions in a sleep aware fashion by taking into account the reachability (e.g., sleep) state of the sleepy node. Thus, in accordance with various example embodiments, intelligent and efficient processing of packets that target sleeping nodes is enabled. Examples of intelligent and efficient processing includes store-and-forward of packets based on sleep state, redirecting a requester to an alternate node or proxy that is not sleeping, notifying a requester that a node is sleeping such that it can take appropriate action, or the like.

The described sleepy node ND protocol extensions may be used to enable solicitation of routers based on their supported sleep attributes and state. For example, a query extension may be added by the nodes to the router solicitation messages that they initiate. Within the query extension, query strings based on the state of sleepy node variables can be included to indicate which routers respond to the router solicitation messages.

Figure 8:
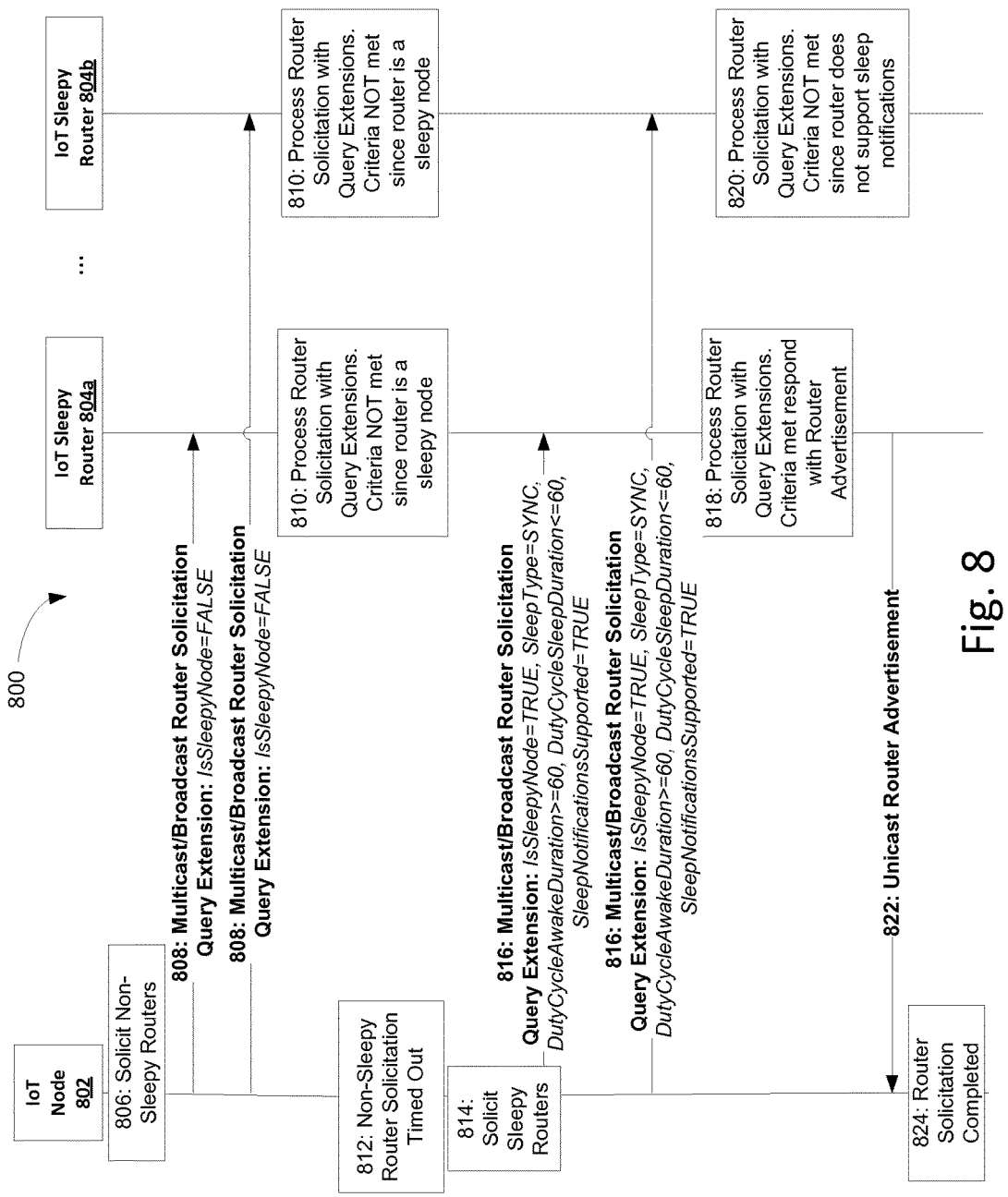
FIG. 8 shows a call flow for querying routers in accordance with an example embodiment.

FIG. 8 shows an example of a router solicitation implemented in an example system 800. The example router solicitation is performed in a sleep aware fashion. The system 800 includes an IoT node 802 and a plurality of IoT sleepy routers 804, for instance a first sleepy router 804a and second router 804b. It will be appreciated that the example system 800 is simplified to facilitate description of the disclosed subject matter and is not intended to limit the scope of this disclosure. Other devices, systems, and configurations may be used to implement the embodiments disclosed herein in addition to, or instead of, a system such as the system 800, and all such embodiments are contemplated as within the scope of the present disclosure.

Referring to FIG. 8, in accordance with the illustrated embodiment, at 806, the node 802, which may be one of the endpoint devices 104 depicted in FIG. 1, determines that the node 802 will solicit routers in the system 800 that do not go to sleep. Such routers can be referred to as non-sleepy routers. The node 802 might solicit these routers because those routers may have the best availability and may be the best candidates to which packets can be forwarded. At 808, the node 802 may solicit the non-sleepy routers by sending a first router solicitation message. The message may be multicast or broadcast. The message may include a query in a query string message that specifies that the desired routers must not go to sleep. At 810, the first and second routers process the first router solicitation message, and determine that they do not meet the criteria specified in the solicitation message because the first and second routers 804a and 804b are sleepy routers. In accordance with the illustrated example, the node 802 does not receive any router advertisements in response to the solicitation at 806. For example, there might not be any non-sleepy routers in the system 800, which may also be referred to as a network 800, without limitation. At 812, the non-sleepy router solicitation times out. Because there are no routers in the network 800 that meet the specified criteria (that the routers are non-sleepy) of the solicitation at 806, the node 802 may decide to transmit a second router solicitation, at 814. The second router solicitation may be sent as a multicast message or as a broadcast message. As shown, at 816, the second router solicitation message is transmitted by the node 802. The second router solicitation may include a new query extension that specifies a list of sleepy node attribute value pairs. FIG. 8 illustrates example sleepy node attributes that are specified by the node 802, but it will be understood that a node may specify any sleepy node attributes as desired. The IoT node 802 may configure the sleepy node attribute value pairs with desired sleepy router attributes that meet its requirements. In accordance with the illustrated example, the node 802 solicits routers that sleep in a periodic fashion, having a duty cycle in which they remain awake for at least 60 seconds and do not sleep for more than 60 seconds, and support sending out notifications each time their sleep state changes. It will be understood that a node may solicit routers using any requirements as desired.

Still referring to FIG. 8, at 818, the first router 804a processes the second solicitation message and determines that the first router 804a meets the criteria specified in the router solicitation. At 820, the second router 804b processes the second solicitation message and determines that the second router 804b does not meet at least one of the requirements specified in the second solicitation message. Thus, in accordance with the illustrated embodiment, the node 802 is successful in soliciting a router (router 804a) that meets its requirements. At 822, the first router may return a router advertisement message back to the node 802, thereby completing the router solicitation at 824.

Figure 9A:
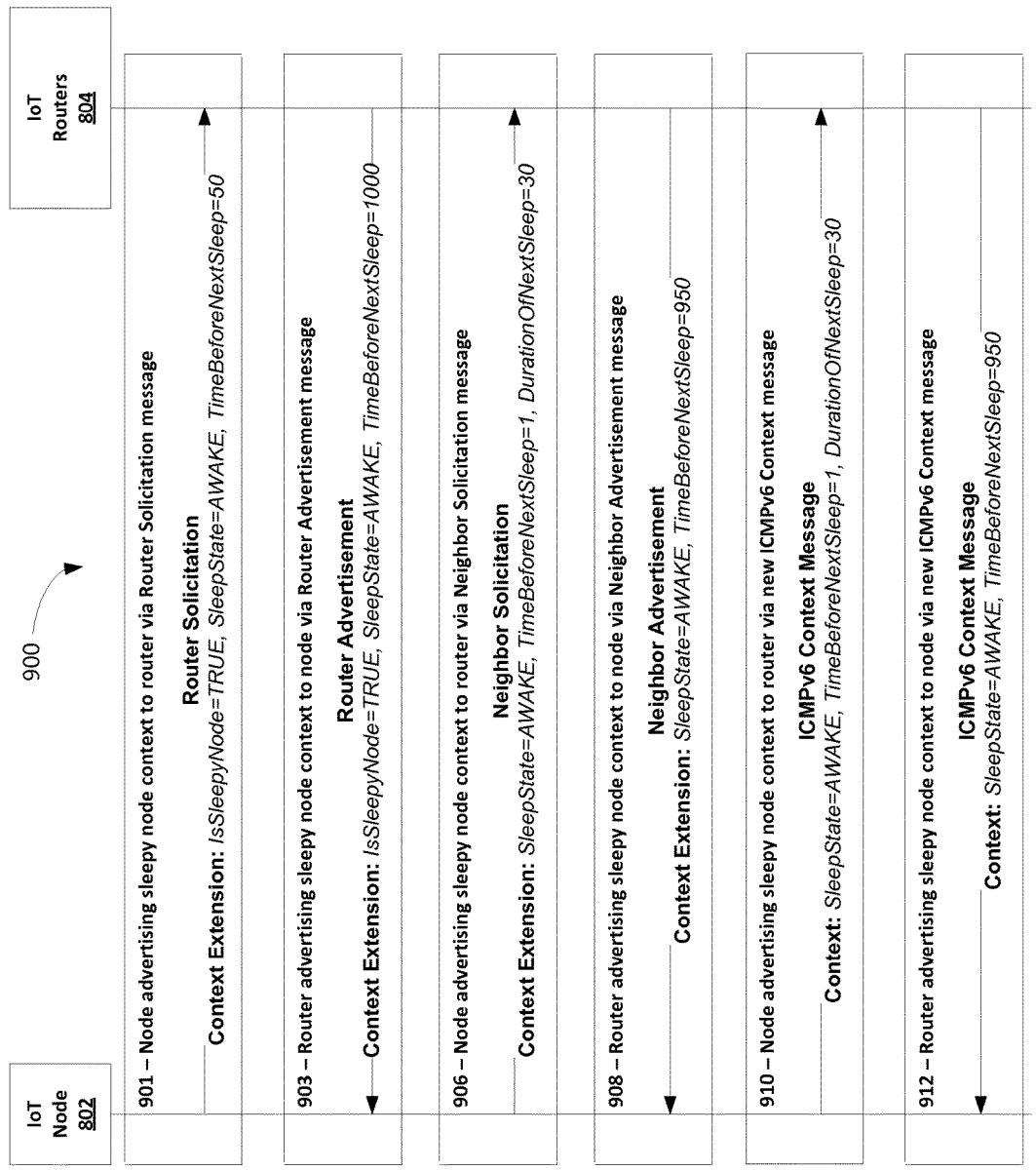
FIG. 9A shows messages that can be exchanged between nodes according to several embodiments.
Figure 9B:
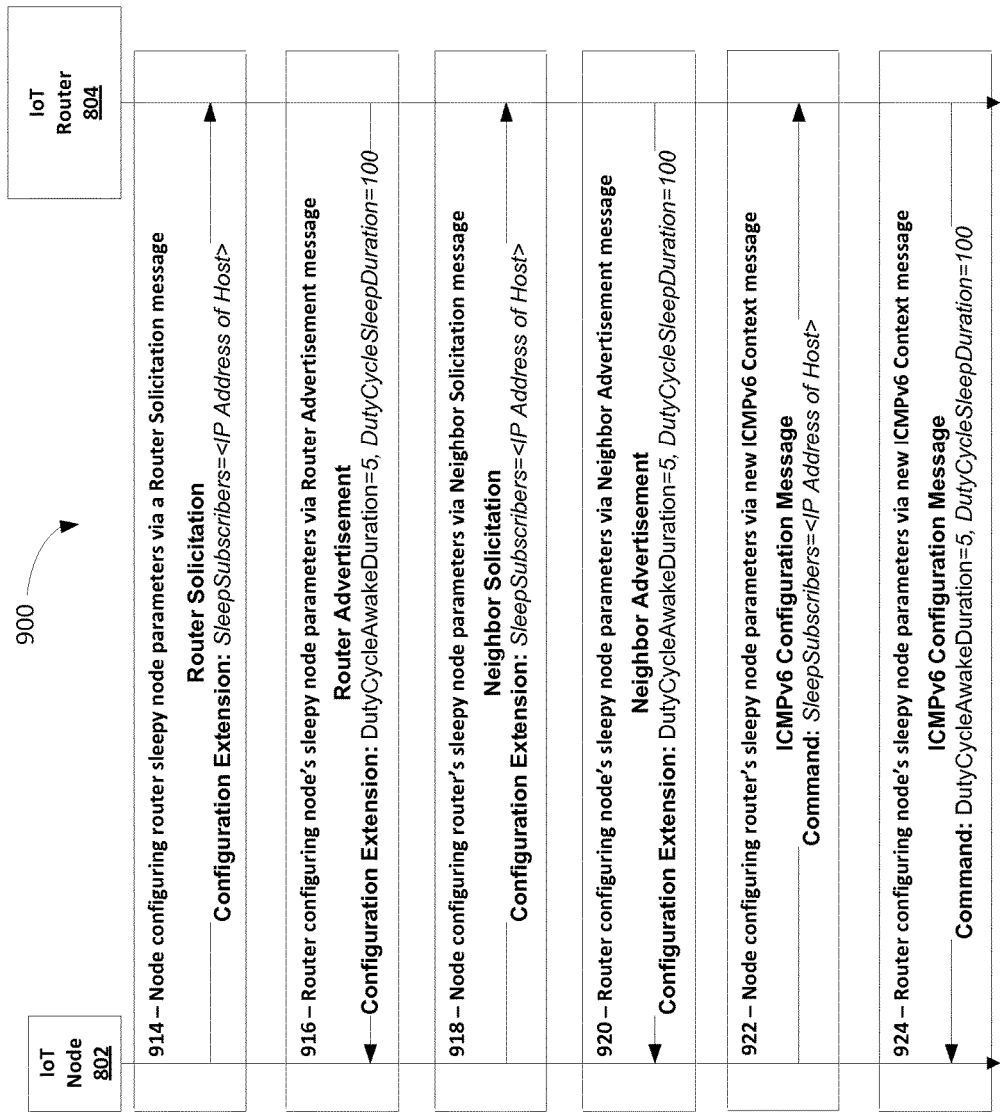
FIG. 9B shows messages for configuring nodes that can be exchanged between nodes according to several other embodiments.

FIGS. 9A and 9B show examples of various sleepy node context information that can be exchanged within a system 900. The system 900 includes the IoT node 802 and the plurality of IoT sleepy routers 804. It will be appreciated that the example system 900 is simplified to facilitate description of the disclosed subject matter and is not intended to limit the scope of this disclosure. Other devices, systems, and configurations may be used to implement the embodiments disclosed herein in addition to, or instead of, a system such as the system 900, and all such embodiments are contemplated as within the scope of the present disclosure. FIG. 9A shows examples of sleepy node context information that may be exchanged such as, for example, whether or not a node is a sleepy node, a node's sleep state, the time before a node is going to go to sleep, the duration of time a node is going to its next sleep for, etc. Alternatively, sleepy node context information may be shared between nodes using the subscription and notification extensions described herein. For example, using ND messages with subscription/notification extensions, an IoT node may subscribe to one or more neighboring IoT nodes to receive notifications if/when their sleepy node variables change state.

Referring to FIG. 9A, at 901, the node 802 sends a router solicitation message to the routers 804 advertising desired sleepy node context information. In accordance with the illustrated example, at 901, the node 802 solicits routers that are sleepy, but currently awake, and the time that must elapse before the routers can go to sleep is at least 50 seconds. It will be understood that seconds are used for purposes of example, and any unit of time can be specified as desired. In another illustrated example, at 903, one of the routers 804 sends a router advertisement message to the node 802 in response to the message at 901. In particular, at 903, the router 804 advertises that it is a sleepy router with a current state of awake, and the router 804 will not go asleep until 1000 seconds have elapsed. In accordance with another illustrated example, at 1006, the node 802 sends a neighbor solicitation message to solicit routers that are in an awake state, will sleep after 1 second, and will sleep for 30 seconds. At 908, one of the routers 804 sends a neighbor advertisement message that advertises that the router is awake and will not sleep until 950 seconds have elapsed. In accordance with another illustrated example, at 910, the node 802 sends an ICMPv6 message that advertises its sleepy context information. In particular, the node 802 advertises to the routers 804 that the node is awake, will sleep after 1 second, and will sleep for 30 seconds. At 912, one of the routers 804 sends an ICMPv6 context message that advertises its sleepy context information. In particular, the router 804 advertises to the node 802 that the router is awake and will not sleep until 950 seconds have elapsed.

As described above, the sleepy node parameters of one node may be configured by other nodes in a network. Referring to FIG. 9B, at 914, 916, 918, and 920, the above-described sleepy node ND protocol extensions are used to enable configuration of sleepy node parameters by other nodes. For example, at 914 and 918, the node 802 configures sleepy node parameters of the router 804 by sending the router a router solicitation message and a neighbor solicitation message, respectively. In accordance with other illustrated examples, at 916 and 920, the router 804 configures sleepy node parameters of the node 802 by sending the node 802 a router advertisement message and a neighbor advertisement message, respectively. By way of the example, at 922, the node 802 configures sleepy node parameters of the router 804 by sending the router 804 an ICMPv6 context message. At 924, the router 804 configures sleepy node parameters of the node 802 by sending the node 802 an ICMPv6 context message. Various sleepy node parameters may be configured by another node in accordance with various embodiments. For example, a sleepy node's duty cycle, which includes the duration of time the node is asleep and awake before going back to sleep sleeps, may be configured by another node using the messages shown in FIG. 9B. By way of further example, a first node may configure a second node such that the first node receives a notification each time a sleep state of the second node changes. It will be understood that other parameters may be configured between nodes as desired.

Figure 10:
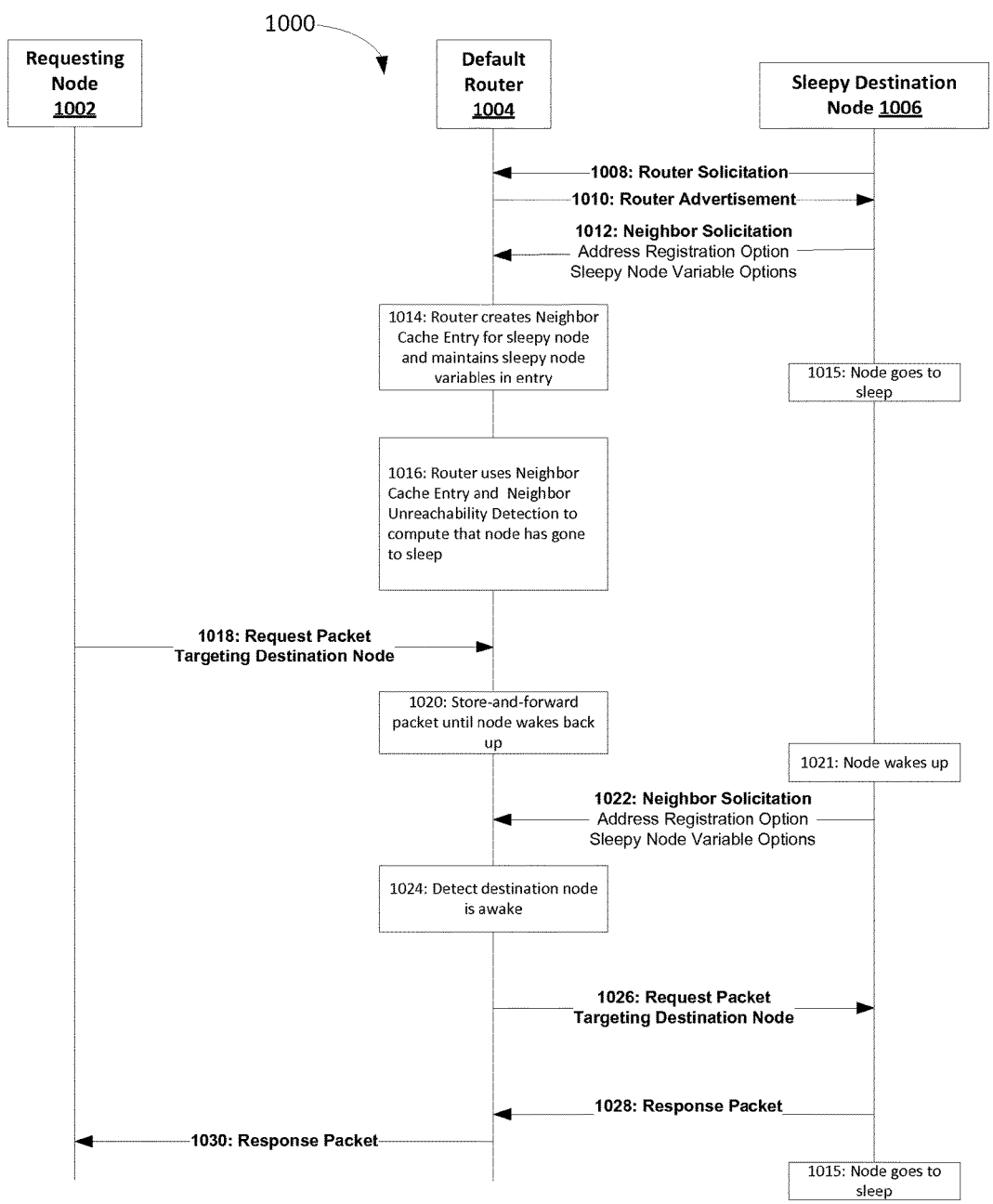
FIG. 10 is a call flow that illustrates store-and-forwarding of requests to sleepy nodes in a network according to an example embodiment.
Figure 11:
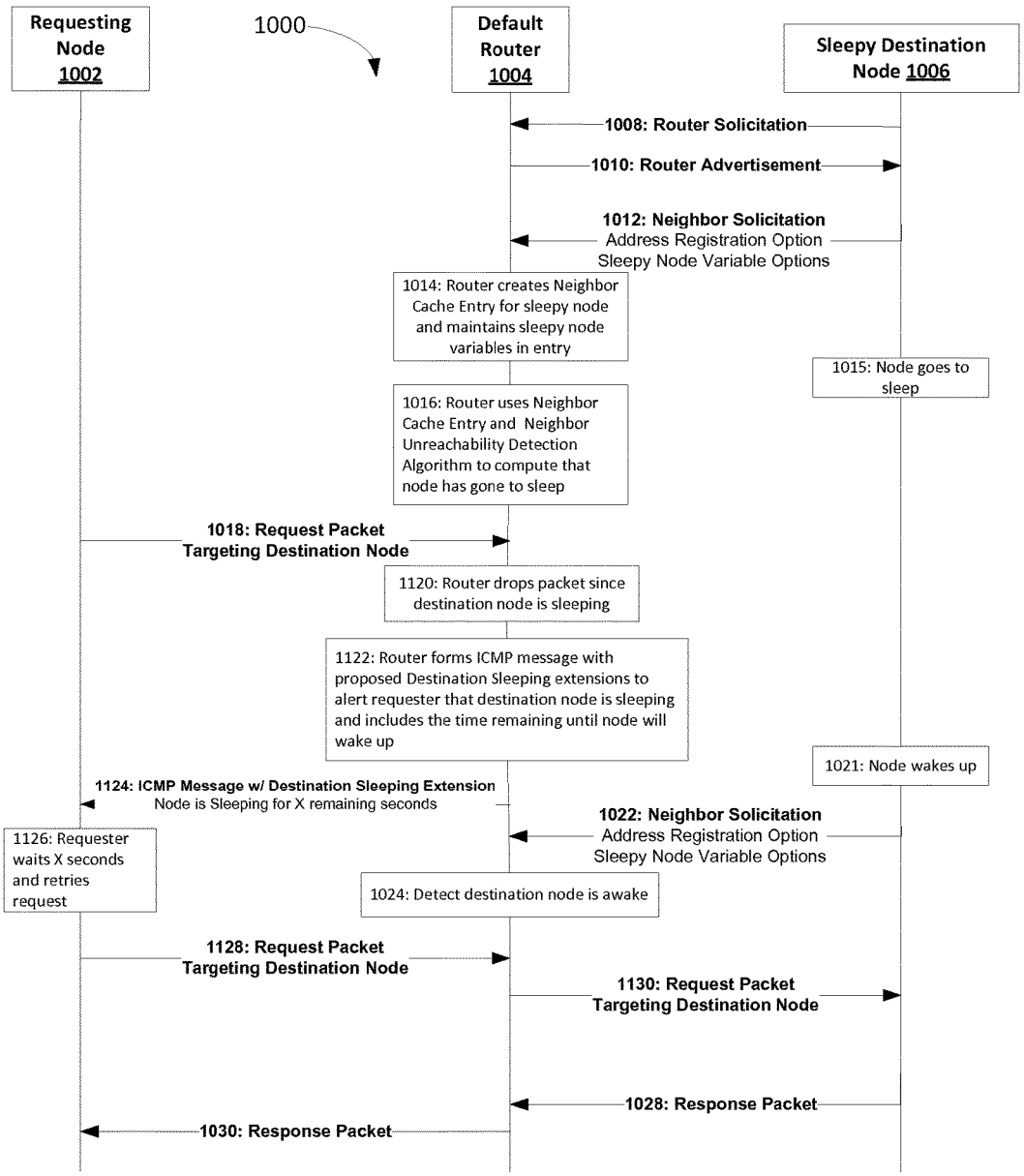
FIG. 11 is a call flow for informing a requesting node of a sleepy node's variables and/or state in accordance with an example embodiment.
Figure 12:
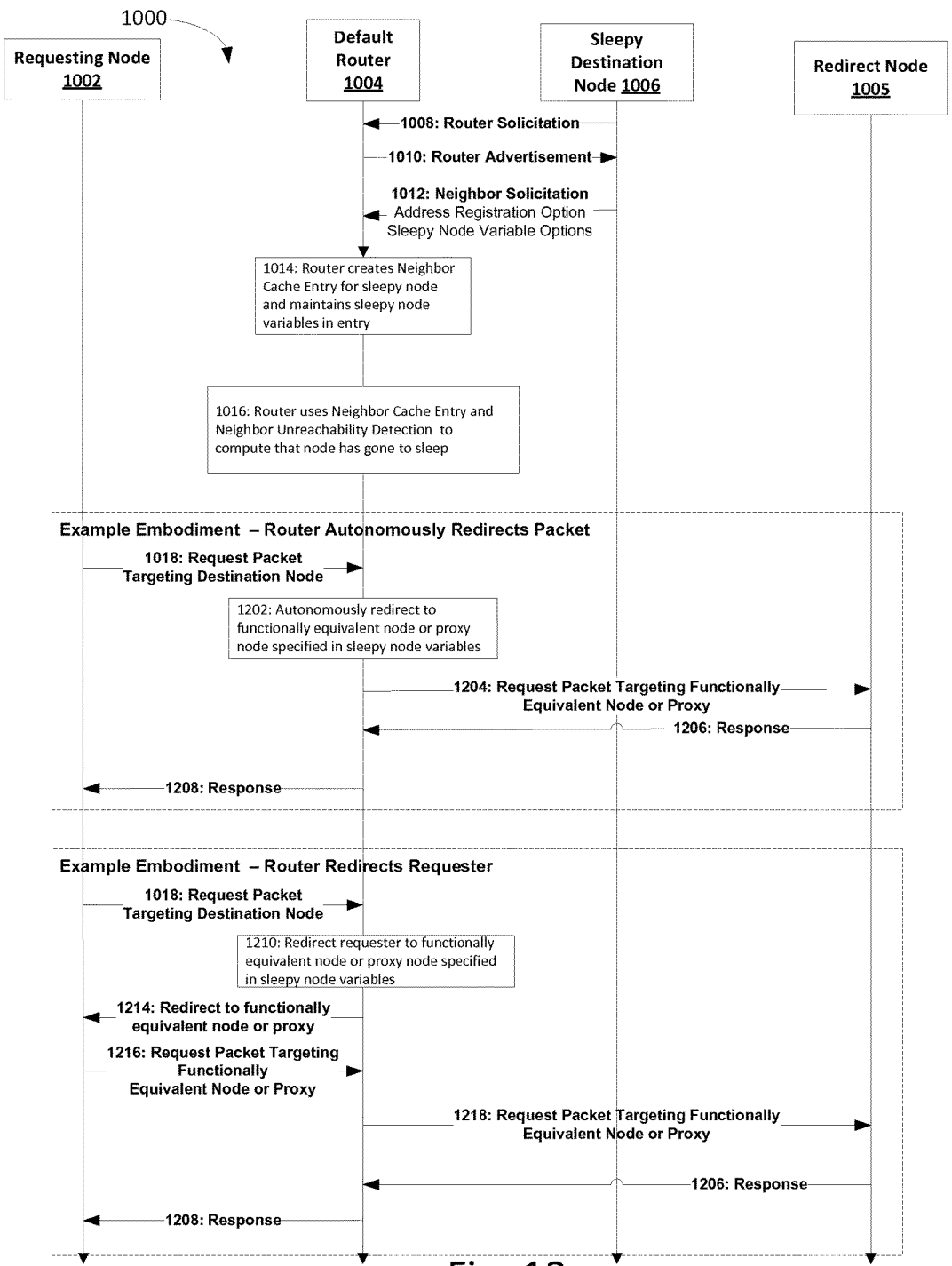
FIG. 12 is a call flow for sleep-aware redirection of packets in accordance with example embodiments.

The above-described sleepy node ND protocol extensions may enable sleep aware store-and-forwarding, sleep aware redirect messages, sleep aware alerts, or the like. FIGS. 10-12 show example sleep aware implementation in an example system 1000, which can also be referred to as a network 1000. The system 1000 includes a first or requesting node 1002, which may be one of the devices 102 depicted in FIG. 1, a default router 1004, and a second or destination node 1006, which is capable of sleeping, and thus may be referred to as a sleepy destination node 1006. It will be appreciated that the example system 1000 is simplified to facilitate description of the disclosed subject matter and is not intended to limit the scope of this disclosure. Other devices, systems, and configurations may be used to implement the embodiments disclosed herein in addition to, or instead of, a system such as the system 1000, and all such embodiments are contemplated as within the scope of the present disclosure.

Referring in particular to FIG. 10, at 1008, the destination node 1006 sends a router solicitation message to the router 1004. At 1010, the router 1004 returns a router advertisement message to the destination node 1006. At 1012, the destination node 1006 sends a neighbor solicitation message to the default router 1004. The message may include an address registration of the destination node 1006 and sleepy node variables associated with the destination node 1006. At 1014, the router 1004 creates a neighbor cache entry that is associated with the destination node 1006. The router 1004 may store and maintain the sleepy node variables associated with the destination node 1006 in the entry. At 1015, the destination node 1006 goes to sleep. At 1016, the router 1004 uses the neighbor cache entry associated with the destination node 1006 and neighbor unreachability detection, for example as described with reference to FIG. 5, to determine that the node 1006 has gone to sleep. At 1002, in accordance with the illustrated embodiment, the requesting node 1002 sends an incoming request packet that is received by the router 1002. The packet targets the node 1006, which is asleep. At 1020, the router 1004 stores the packet until the destination node 1006 is awake. For example, the router 1004 may store the packet for a time duration specified in one of the sleepy node variables indicative of sleepy attributes of the destination node 1006. At 1021, the node 1006 wakes up. At 1022, the destination node 1006 sends another neighbor solicitation message to the router 1004. At 1024, the router 1004 detects that the node 1006 is awake. At 1026, in accordance with the illustrated embodiment, after determining that the node 1006 is awake, the router 1004 sends the packet to the destination node 1006, thereby completing a sleep aware store-and-forward implementation in accordance with an example embodiment. For example, the router 1004 may send the packet to the destination node 1006 when the time duration specified in one of the sleepy node variables elapses. At 1028 and 1030, the destination node 1006 may send a response packet to the node 1002, via the router 1004.

Referring now to FIG. 11, the above-described sleepy node ND protocol extensions can be used to alert the requesting node 1002 that the targeted destination node 1006 is sleeping, and the router 1004 can inform the requesting node 1002 when the destination node 1006 is next available. It will be understood that reference numbers are repeated in various figures to denote the same or similar features. The sleepy node 1006 can share its sleepy node variables/state with the default router 1004, for example, when the node 1006 registers with the router 1004. At 1122, in accordance with the illustrated example, the router 1104 drops the packet sent at 1018 because the node 1006 is sleeping. At 1124, the router 1104 sends an ICMP message, which may be also referred to as an alert, to the requesting node 1002 that indicates that the node 1006 is sleeping for a particular time period. The particular time period is defined such that the node 1006 will wake after the time period elapses. The time period may also be referred to as a sleep time that remains before the destination node 1006 wakes up. At 1126, in accordance with the illustrated embodiment, the requesting node 1002 waits until the time period is away. After the time period elapses, at 1128, the requesting node 1002 resends the request packet to router 1004. At 1024, the router 1004 detects that the destination node 1006 is awake. Thus, at 1130, the router 1004 forwards the packet to the destination node 1006, which is awake and receives the packet. Thus, the router 1004 can drop the packet that targets the sleepy node 1006 that is sleeping, and the router 1004 may send a corresponding alert (at 1124) to the requesting node 1002. In the alert, for example, the router 1004 can indicate that the destination node is sleeping and may include additional information, such as amount of time remaining before the node 1006 is expected to wake up for example. The requesting node 1002 may determine what action, if any, to take in response to the alert. For example, the requesting node 1002 may retry the request based on the sleep information contained within the alert message, as shown in FIG. 11.

Referring now to FIG. 12, by leveraging the sleepy node variables/state and the sleep-aware next-hop determination and neighbor unreachability detection mechanisms described herein, the router 1004 can perform sleep aware redirection of requests to a node that is functionally equivalent to the destination node 1006 or a proxy that services requests on behalf of the node 1006. Referring to FIG. 12, the network 1000 further includes a redirect node 1005, which can be a proxy for the destination node 1006 or can be a node that is functionally equivalent to the destination node 1006. The router 1004 can be made aware of a one or more functionally equivalent nodes, for instance the redirect node 1005, via the SleepGroup variable depicted in Table 1, according to an example embodiment. Further, the router 1004 can be made aware of one more proxy nodes, for instance the redirect node 1005, via the SleepProxy variable depicted in Table 1 above. Using at least one of the SleepGroup variable or the SleepProxy variable, along with the sleep state of the node 1006, the router 1004 can redirect requests when the node 1004 is sleeping. Thus, a redirect node can be specified by one of the sleepy node variables indicative of sleepy attributes of the destination node 1006.

Still referring to FIG. 12, in accordance with one illustrated embodiment, when the request packet is received by the router 1004, the router 1004 determines that it will autonomously redirect the packet to the redirect node 1005, at 1202. The identity of the redirect node 1005 may be indicated by one or more sleepy variables described herein. At 1204, the router 1004 may send the packet to the redirect node 1005. In an alternative embodiment, when the request packet is received by the router 1004, the router 1004 determines that it will direct the requester node 1002 to the redirect node 1005, at 1210. Thus, at 1212, the router 1004 may redirect the requester 1002 by sending the requesting node 1002 an ND redirect message that specifies the address of the redirect node 1005. At 1214, based on the redirect message, the requester node 1002 may resend the request packet to the router 1004. At 1214, the request packet may target the redirect node 1005 instead of the destination node 1006, as it targeted at 1018. When redirect node 1005 receives the request packet, whether the request packet is received from the requesting node 1002 or the router 1004, the redirect node 1005 may send a response packet to the requesting node 1002, via the router 1004, at 1206 and 1208.

Figure 13A:
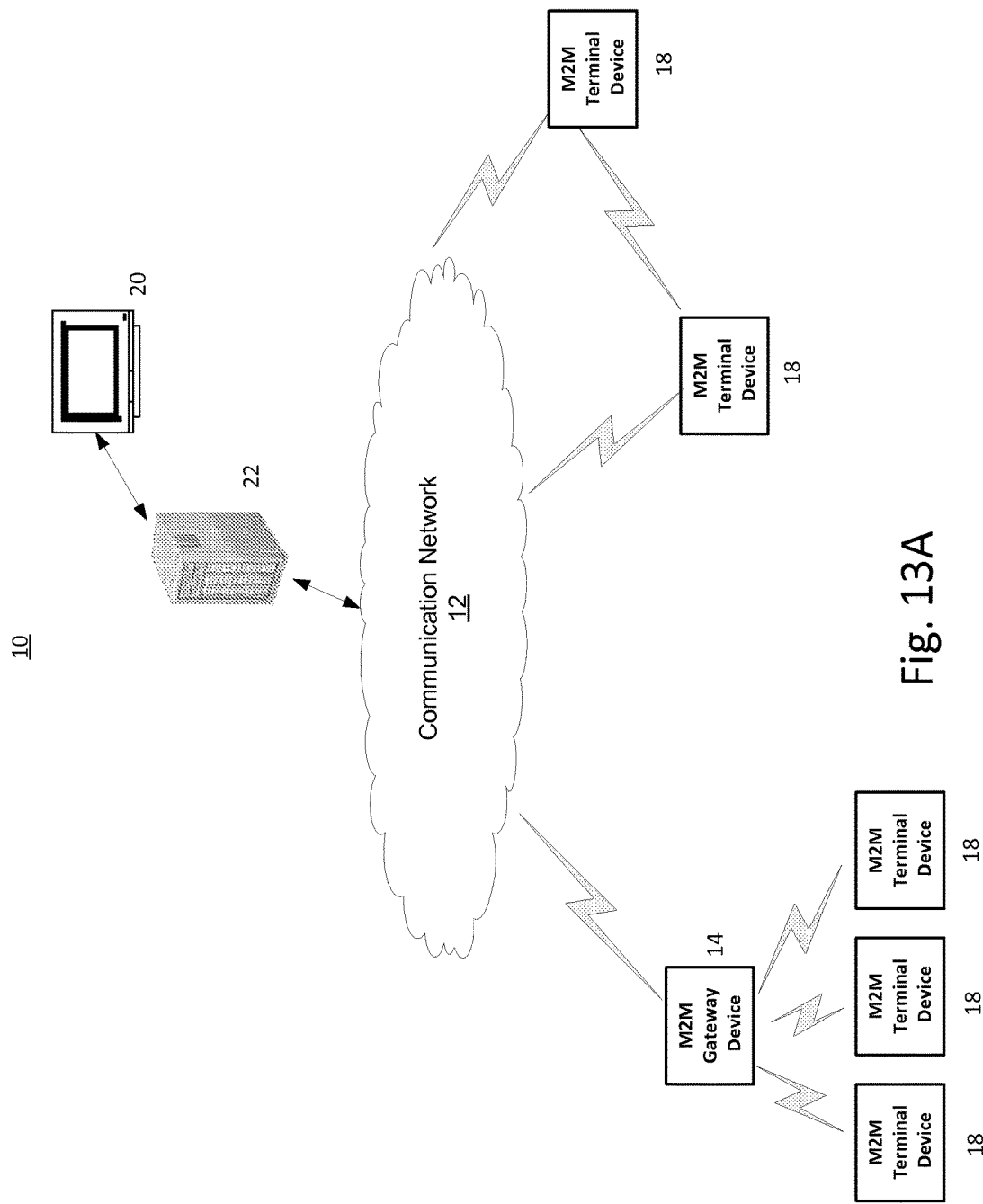
FIG. 13A is a system diagram of an example machine-to-machine (M2M) or Internet of Things (IoT) communication system in which one or more disclosed embodiments may be implemented.

FIG. 13A is a diagram of an example machine-to machine (M2M), Internet of Things (IoT), or Web of Things (WoT) communication system 10 in which one or more disclosed embodiments may be implemented. For example, the various sleepy nodes described with reference to FIGS. 1-12 may be various devices depicted in FIG. 13A, as described further below. Generally, M2M technologies provide building blocks for the IoT/WoT, and any M2M device, gateway or service platform may be a component of the IoT/WoT as well as an IoT/WoT service layer, etc.

As shown in FIG. 13A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 13A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. The gateway devices 14 or the terminal devices 18 may be configured as sleepy nods in a system that performs sleep aware operations in accordance with the embodiments described above. The gateway devices 14 and/or the terminal devices 18 may be configured as the nodes described above, and thus each of the gateway devices 14 and the terminal devices 18 may be aware of the sleep attributes of each other. Further, each of the gateway devices 14 may be configured as the redirect node 1005, as described above with reference to FIG. 12. Each of the M2M gateway devices 14 and M2M terminal devices 18 are configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, such as the sleepy variables depicted in Table 1 for example, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. The terminal devices 18 and the gateway devices 14 may communicate via various networks to exchange ND messages, as described above. For example, sleep aware messaging described above can occur directly between multiple terminal devices 18, directly between multiple gateway devices 14, or directly between terminal devices 18 and gateway devices 14.

Figure 13B:
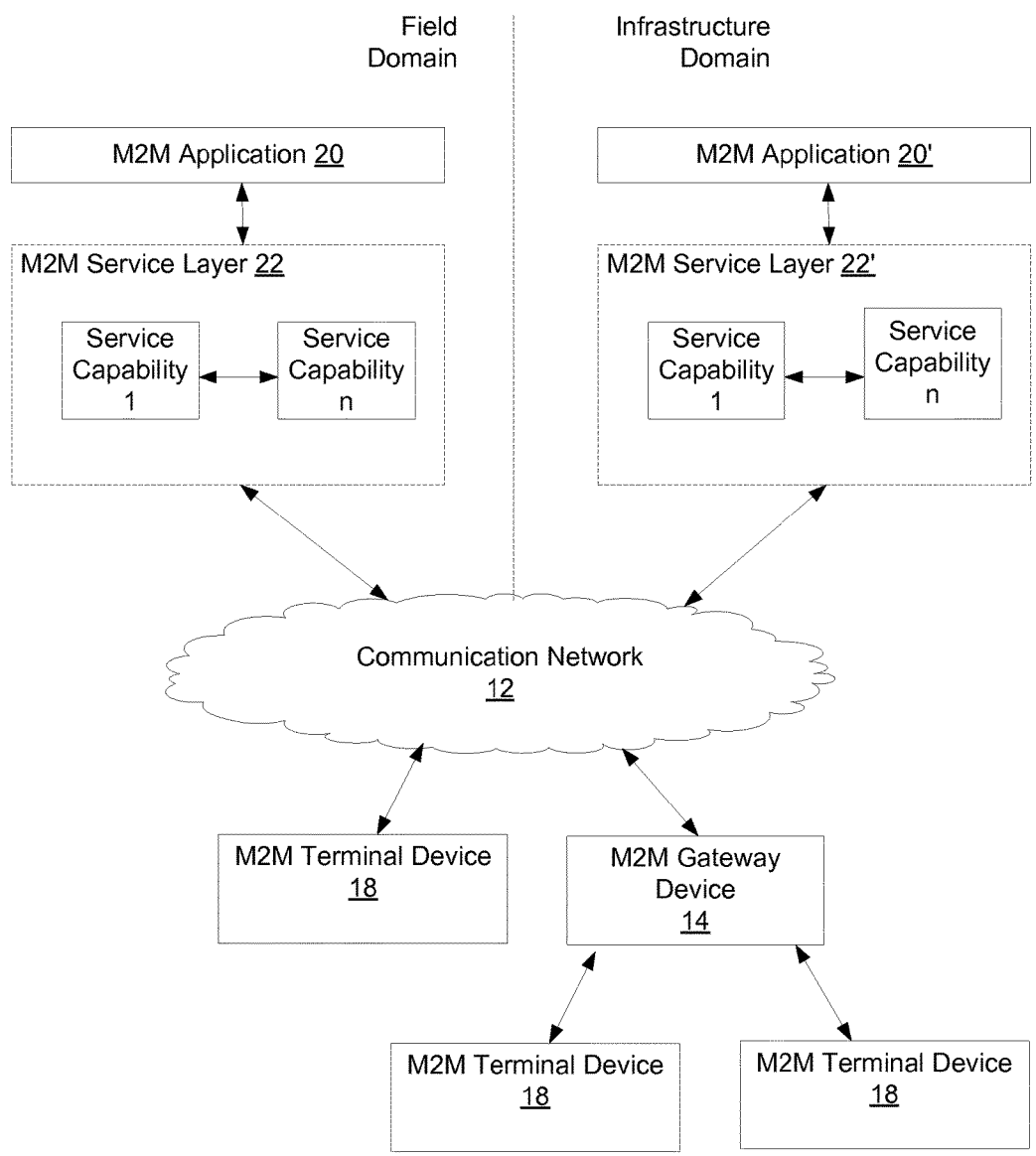
FIG. 13B is a system diagram of an example architecture that may be used within the M2M/IoT communications system illustrated in FIG. 13A.

Referring also to FIG. 13B, the illustrated M2M service layer 22 in the field domain provides services for the M2M application 20, M2M gateway devices 14, M2M terminal devices 18 and the communication network 12. It will be understood that the M2M service platform 22 may communicate with any number of M2M applications, M2M gateway devices 14, M2M terminal devices 18, and communication networks 12 as desired. The M2M service layer 22 may be implemented by one or more servers, computers, or the like. The M2M service 22 layer provides service capabilities that apply to the M2M terminal devices 18, the M2M gateway devices 14, and the M2M applications 20. The functions of the M2M service layer 22 may be implemented in a variety of ways, for example as a web server, in the cellular core network, in the cloud, etc.

Similar to the illustrated M2M service layer 22, an M2M service layer 22' resides in the infrastructure domain. The M2M service layer 22' provides services for an M2M application 20' and an underlying communication network 12' in the infrastructure domain. The M2M service layer 22' also provides services for the M2M gateway devices 14 and M2M terminal devices 18 in the field domain. It will be understood that the M2M service layer 22' may communicate with any number of M2M applications, M2M gateway devices, and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring still to FIG. 13B, the M2M service layers 22 and 22' can provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities can free the applications of the burden of implementing these functionalities, thus simplifying application development and reducing cost and time to market. The service layers 22 and 22' also may enable M2M applications 20 and 20' to communicate through various networks 12 and 12' in connection with the services that the service layers 22 and 22' provide.

The sleep aware operations of the present application may be implemented as part of a service layer. As used herein, a service layer may refer to a software middleware layer that supports value-added service capabilities through a set of Application Programming Interfaces (APIs) and underlying networking interfaces. Both ETSI M2M and one M2M use a service layer that may contain the context managers described herein. ETSI M2M's service layer is referred to as the Service Capability Layer (SCL). Embodiments described herein may be implemented as part of the SCL, wherein the messages may be based on various protocols such as, for example, MQTT or AMQP. The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (e.g., service capabilities). An instantiation of a set of one or more particular types of CSFs is referred to as a Common Services Entity (CSE) which can be hosted on different types of network nodes (e.g. infrastructure node, middle node, application-specific node). Further, sleep aware operations described herein can be implemented as part of an M2M network that uses a Service Oriented Architecture (SOA) and/or a resource-oriented architecture (ROA) to access.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Figure 13C:
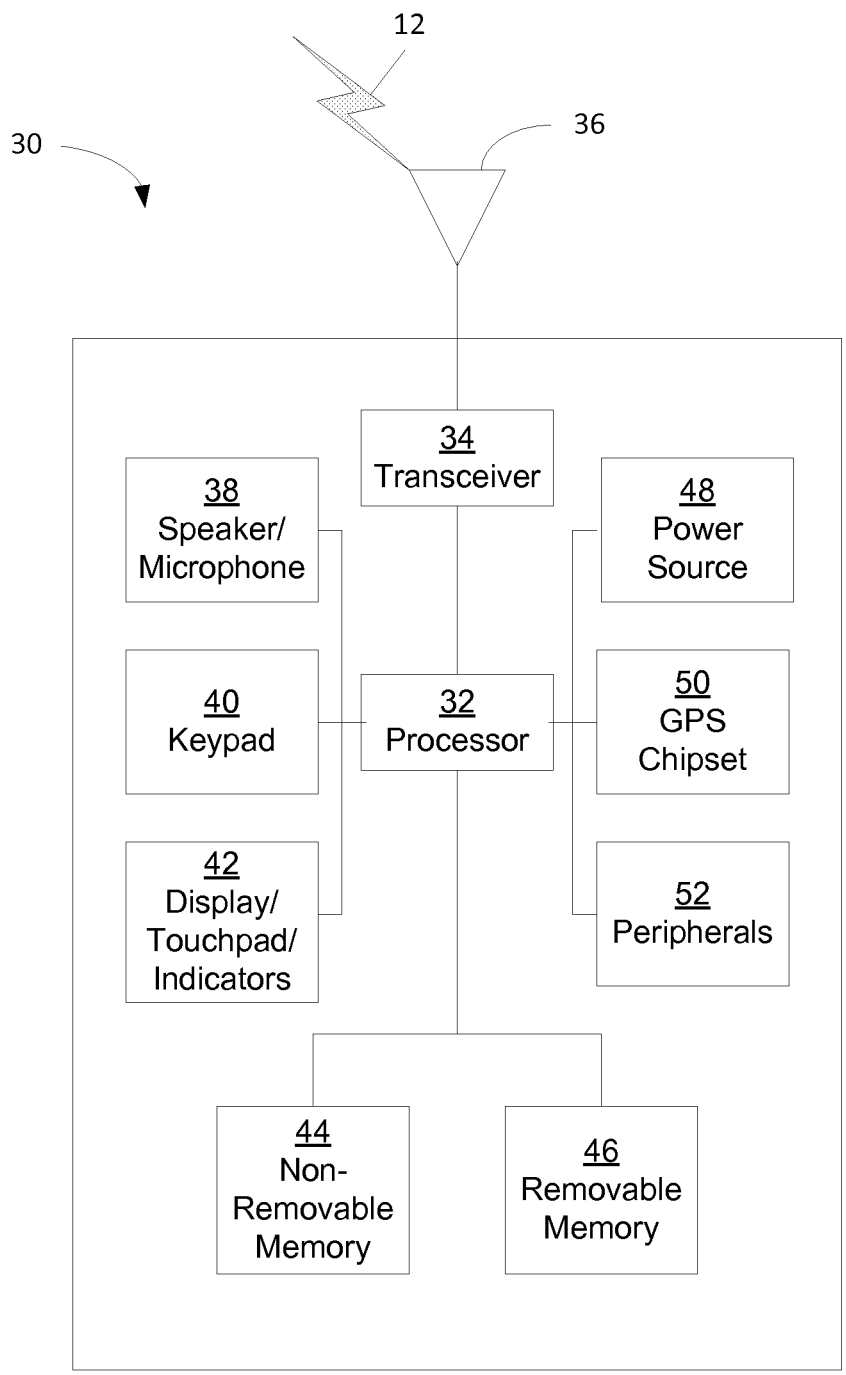
FIG. 13C is a system diagram of an example M2M/IoT terminal or gateway device that may be used within the communications system illustrated in FIG. 13A.

FIG. 13C is a system diagram of an example M2M device 30, such as an M2M terminal device 18 or an M2M gateway device 14 for example. The M2M device 30 may be configured as a requesting node, a destination node, a router, or a redirect node, in accordance with the embodiments described above. As shown in FIG. 13C, the M2M device 30 may include a processor 32, a transceiver 34, a transmit/receive element 36, a speaker/microphone 38, a keypad 40, a display/touchpad/indicators 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. The display/touchpad/indicators 42 may be generally referred to as a user interface in accordance with an example embodiment. The user interface, may allow users to monitor, manage, and/or configure sleepy attributes on a node, such as a gateway (router) or other network node for example. For example, the user interface may enable a user to configure or trigger a duty cycle on an endpoint device or router. Thus, various sleep attributes associated with a node may be displayed by the display/touchpad/indicators 42.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 13C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 13C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store and access context information, as described above, from the non-removable memory 44 and/or the removable memory 46 to determine whether there is context information that satisfies a context information request. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 13D:
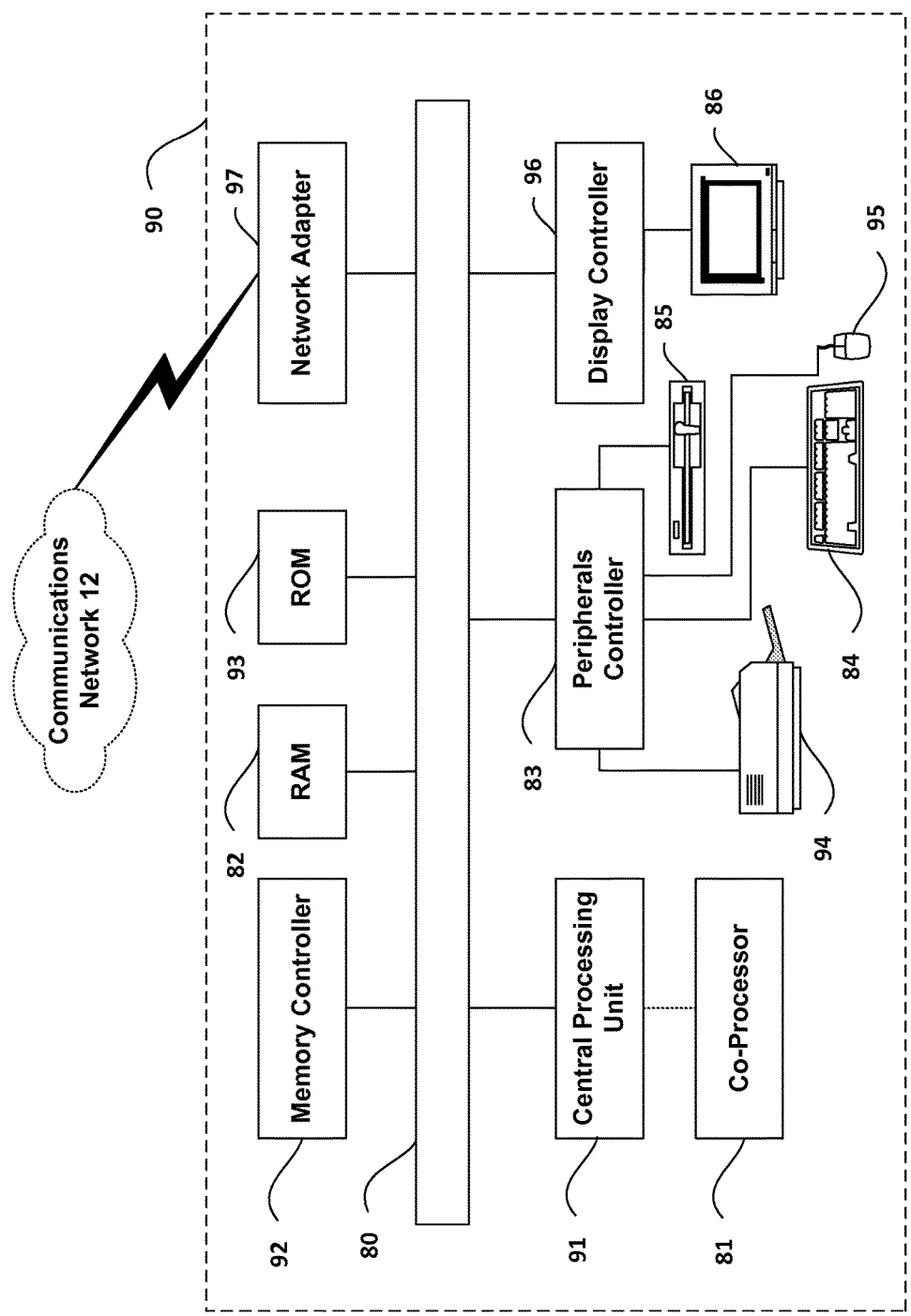
FIG. 13D is a block diagram of an example computing system in which aspects of the communication system of FIG. 13A may be embodied.

FIG. 13D is a block diagram of an exemplary computing system 90 on which, for example, the M2M service platform 22 of FIGS. 13A and 13B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 13A and 13B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims. This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. In a system comprising a plurality of nodes that communicate with each other via a network, a method comprising, at a first node of the plurality of nodes:

receiving a packet that is targeted for a second node of the plurality of nodes;

based on an advertisement of the second node, determining that the second node is a sleepy node configured to enter a low power state and suspend communications with the first node;

determining a reachability state of the second node;

receiving a message that includes one or more sleepy node variables indicative of sleep attributes of the second node;

processing the packet based on the determined reachability state and in accordance with the one or more sleepy node variables received in the message;

storing the packet for a time duration specified in one of the sleepy node variables; and when the time duration elapses, sending the packet to the second node.

2. The method as recited in claim 1, wherein the determined reachability state is a sleeping state, the method further comprising:

sending an alert to a node that sent the packet, the alert including a sleep time that remains before the second node wakes up.

3. The method as recited in claim 1, wherein the determined reachability state is a sleeping state, the method further comprising:

sending the packet to a redirect node specified by one of the sleepy node variables, wherein the redirect node is at least one of a proxy for the second node or functionally equivalent to the second node.

4. The method as recited in claim 1, wherein the determined reachability state is a sleeping state, the method further comprising:

sending a redirect message to a node that sent the packet, the redirect message including one of the sleepy node variables indicating an address of a redirect node, wherein the redirect node is at least one of a proxy for the second node or functionally equivalent to the second node.

5. The method as recited in claim 1, the method further comprising:

storing the reachability state of the second node in a neighbor cache entry associated with the second node; and removing the neighbor cache entry associated with the second node when the determined reachability state is an unreachable state.

6. The method as recited in claim 1, the method further comprising: generating an advertisement message that includes one or more sleepy node variables indicative of sleepy attributes of the first node.

7. The method as recited in claim 6, wherein the sleepy attributes include at least one of a sleep pattern associated with the first node, a duty cycle associated with the first node, and a requirement that the first node is notified when a sleep state of the second node changes.

8. A first network node in a network of connected nodes, the first network node comprising:

a first processor adapted to execute computer-readable instructions; and a first memory communicatively coupled to said first processor, said first memory having stored therein computer-readable instructions that, when executed by the first processor, cause the processor to perform operations comprising:

receiving a packet that is targeted for a second network node in the network of connected nodes;

based on an advertisement of the second network node, determining that the second network node is a sleepy node configured to enter a low power state and suspend communications with the first network node;

determining a reachability state of the second network node;

receiving a message that includes one or more sleepy node variables indicative of sleepy attributes of the second network node;

processing the packet based on the determined reachability state and in accordance with the one or more sleepy node variables received in the message;

storing the packet for a time duration specified in one of the sleepy node variables; and when the time duration elapses, sending the packet to the second network node.

9. The first network node as recited in claim 8, wherein the determined reachability state is a sleeping state, the operations further comprising:

sending an alert to a node that sent the packet in the network of connected nodes, the alert including a sleep time that remains before the second network node wakes up.

10. The first network node as recited in claim 8, wherein the determined reachability state is a sleeping state, the operations further comprising:

sending the packet to a redirect node in the network of connected nodes, the redirect node specified by one of the sleepy node variables, wherein the redirect node is at least one of a proxy for the second network node or functionally equivalent to the second network node.

11. The first network node as recited in claim 8, wherein the determined reachability state is a sleeping state, the operations further comprising:

sending a redirect message to a node that sent the packet in the network of connected nodes, the redirect message including one of the sleepy node variables indicating an address of a redirect node in the network of connected nodes, wherein the redirect node is at least one of a proxy for the second network node or functionally equivalent to the second network node.

12. The first network node as recited in claim 8, the operations further comprising:

storing the reachability state of the second network node in a neighbor cache entry associated with the second network node; and removing the neighbor cache entry associated with the second network node when the determined reachability state is an unreachable state.

13. The first network node as recited in claim 8, the operations further comprising:

generating an advertisement message that includes one or more sleepy node variables indicative of sleepy attributes of the first network node.

14. The first network node as recited in claim 13, wherein the sleepy attributes include at least one of a sleep pattern associated with the first network node, a duty cycle associated with the first network node, or a requirement that the first network node is notified when a sleep state of the second network node changes.

* * * * *